(12) United States Patent
Kohli

(10) Patent No.: US 8,504,723 B2
(45) Date of Patent: Aug. 6, 2013

(54) ROUTING PROXY FOR RESOURCE REQUESTS AND RESOURCES

(75) Inventor: Jaspal Kohli, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 141 days.

(21) Appl. No.: 13/161,117

(22) Filed: Jun. 15, 2011

(65) Prior Publication Data
US 2012/0324110 A1 Dec. 20, 2012

(51) Int. Cl.
*G06F 15/16* (2006.01)
(52) U.S. Cl.
USPC ............ 709/245; 709/223; 709/229; 709/238
(58) Field of Classification Search
None
See application file for complete search history.

(56) References Cited

U.S. PATENT DOCUMENTS

| | | | |
|---|---|---|---|
| 5,961,593 A * | 10/1999 | Gabber et al. ............... | 709/219 |
| 6,366,912 B1 * | 4/2002 | Wallent et al. .............. | 1/1 |
| 6,738,808 B1 * | 5/2004 | Enzmann et al. ............ | 709/223 |
| 6,925,461 B2 * | 8/2005 | Byers ............................ | 1/1 |
| 7,013,290 B2 * | 3/2006 | Ananian ..................... | 705/26.42 |
| 7,069,319 B2 * | 6/2006 | Zellner et al. ............... | 709/224 |
| 7,401,115 B1 * | 7/2008 | Arsenault .................... | 709/203 |
| 7,412,422 B2 * | 8/2008 | Shiloh ........................... | 705/74 |
| 7,418,503 B2 * | 8/2008 | Zellner et al. ............... | 709/225 |
| 7,555,474 B2 * | 6/2009 | Byers ............................ | 1/1 |
| 7,685,279 B2 * | 3/2010 | Miltonberger et al. ....... | 709/225 |
| 7,702,772 B2 * | 4/2010 | Kurup et al. ................ | 709/223 |
| 7,861,286 B2 * | 12/2010 | M'Raihi et al. .............. | 726/5 |
| 8,010,639 B2 * | 8/2011 | Byers .......................... | 709/221 |
| 8,301,787 B2 * | 10/2012 | Li ................................. | 709/229 |
| 2001/0034709 A1 * | 10/2001 | Stoifo et al. ................. | 705/51 |
| 2002/0128925 A1 * | 9/2002 | Angeles ....................... | 705/26 |
| 2003/0208570 A1 * | 11/2003 | Lapidous .................... | 709/222 |
| 2004/0002903 A1 * | 1/2004 | Stolfo et al. ................. | 705/26 |
| 2005/0273849 A1 * | 12/2005 | Araujo et al. ................ | 726/12 |
| 2006/0015722 A1 * | 1/2006 | Rowan et al. ............... | 713/166 |
| 2006/0117093 A1 | 6/2006 | Aviani, Jr. et al. | |
| 2007/0099634 A1 * | 5/2007 | Chari et al. ................. | 455/456.3 |
| 2007/0204003 A1 * | 8/2007 | Abramson .................. | 709/217 |
| 2007/0271380 A1 * | 11/2007 | Chang et al. ................ | 709/225 |
| 2008/0005264 A1 * | 1/2008 | Brunell et al. .............. | 709/217 |

(Continued)

FOREIGN PATENT DOCUMENTS

WO    WO 2006/052714 A2    5/2006

OTHER PUBLICATIONS

Co-pending U.S. Appl. No. 13/161,077, entitled "Network Integrated Dynamic Resource Routing", by Jaspal Kohli, filed on Jun. 15, 2011, 60 pages.
Co-pending U.S. Appl. No. 13/160,090, entitled "Terminating Connections and Selecting Target Source Devices for Resource Requests", by Jaspal Kohli, filed on Jun. 15, 2011, 62 pages.
Seedorf et al., "Application-Layer Traffic Optimization (ALTO) Problem Statement", Network Working Group RFC-5693, Oct. 2009, 14 pages.
European Search Report corresponding to EP 11 19 2560 mailed Feb. 17, 2012, 8 pages.

*Primary Examiner* — Ninos Donabed
(74) *Attorney, Agent, or Firm* — Harrity & Harrity, LLP

(57) ABSTRACT

A device receives, from a client device, a request for a resource, where the request provides an identifier of the client device. The device selects a target device for the resource, connects with the selected target device, and provides a proxy of the request to the selected target device, where the proxy of the request hides the identifier of the client device. The device receives the resource from the selected target device, where the resource provides an identifier of the target device. The device provides a proxy of the resource to the client device, where the proxy of the resource hides the identifier of the target device.

25 Claims, 14 Drawing Sheets

(56) References Cited

U.S. PATENT DOCUMENTS

| | | |
|---|---|---|
| 2008/0077657 A1 | 3/2008 | Tagami et al. |
| 2008/0189298 A1* | 8/2008 | Cha .................................. 707/10 |
| 2008/0209028 A1* | 8/2008 | Kurup et al. ................... 709/224 |
| 2009/0083320 A1* | 3/2009 | Adams et al. .............. 707/104.1 |
| 2009/0083321 A1* | 3/2009 | Adams et al. .............. 707/104.1 |
| 2009/0083636 A1* | 3/2009 | Troiano et al. ................. 715/747 |
| 2009/0228582 A1* | 9/2009 | White et al. ................... 709/224 |
| 2009/0282047 A1* | 11/2009 | Lin et al. .......................... 707/10 |
| 2010/0268603 A1* | 10/2010 | Nolet et al. ................. 705/14.53 |
| 2011/0022559 A1* | 1/2011 | Andersen et al. ............... 706/47 |
| 2011/0047623 A1* | 2/2011 | Chang et al. .................... 726/26 |
| 2011/0276404 A1* | 11/2011 | Taysom et al. ............. 705/14.66 |
| 2012/0246338 A1* | 9/2012 | Li .................................. 709/238 |

\* cited by examiner

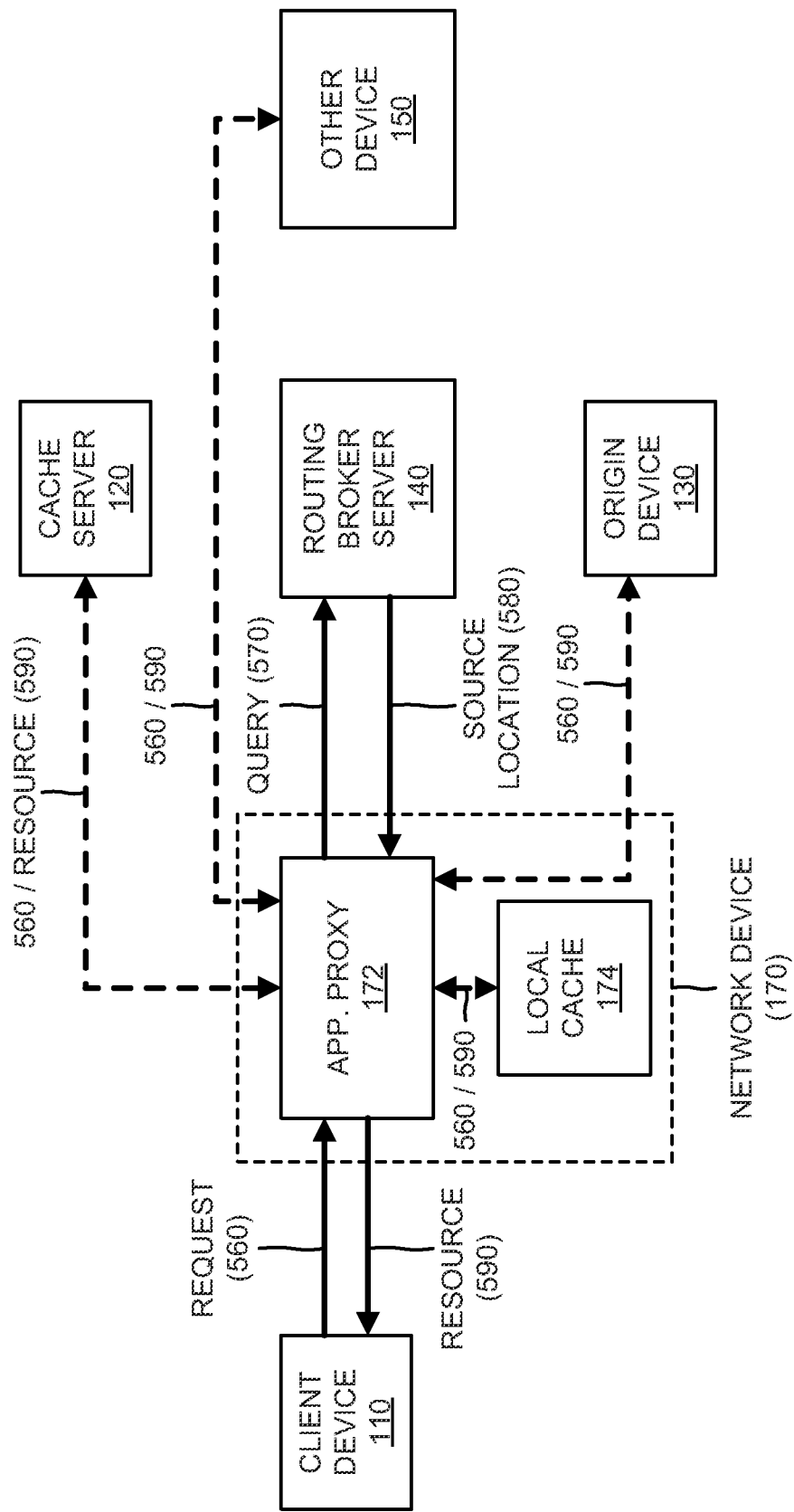

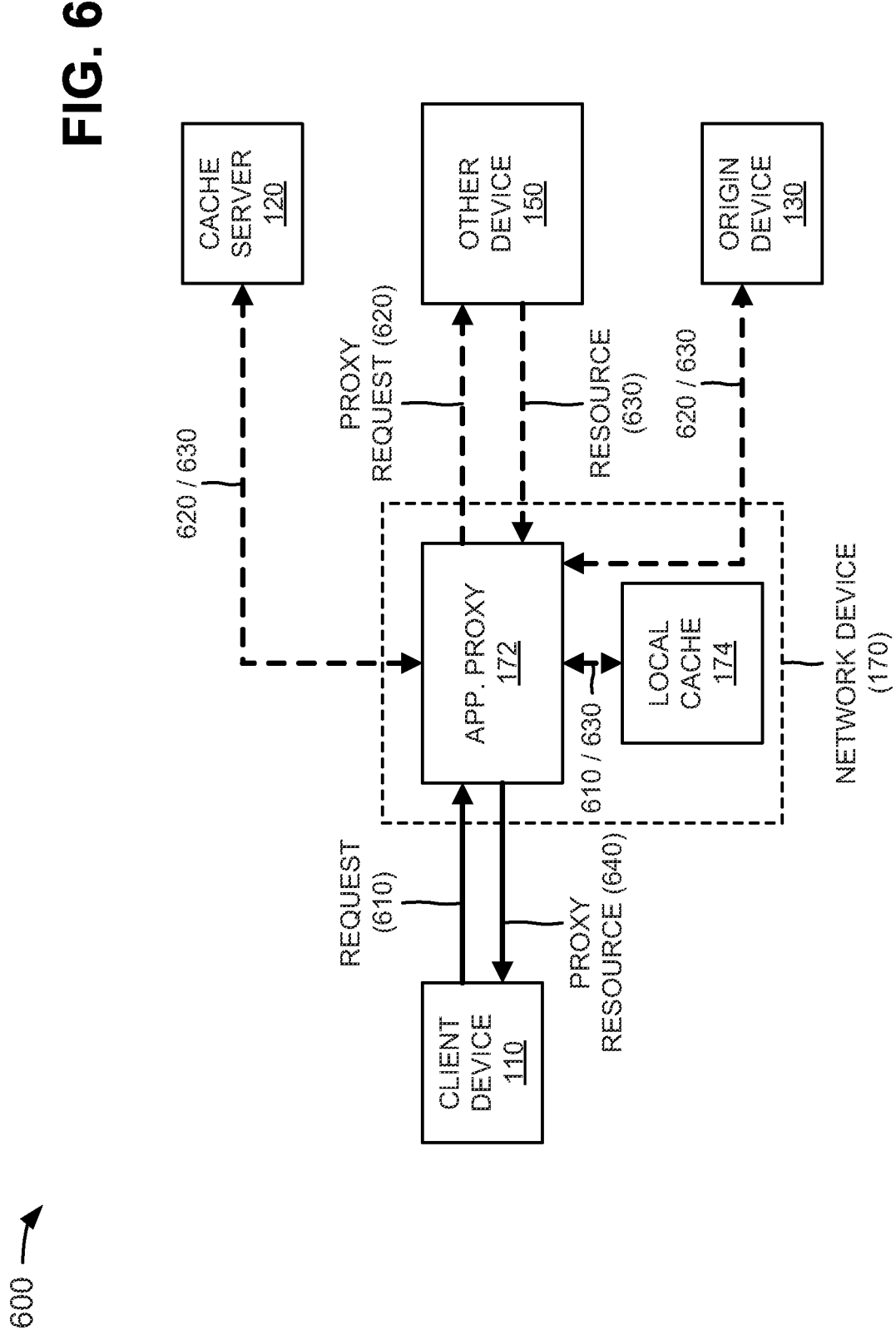

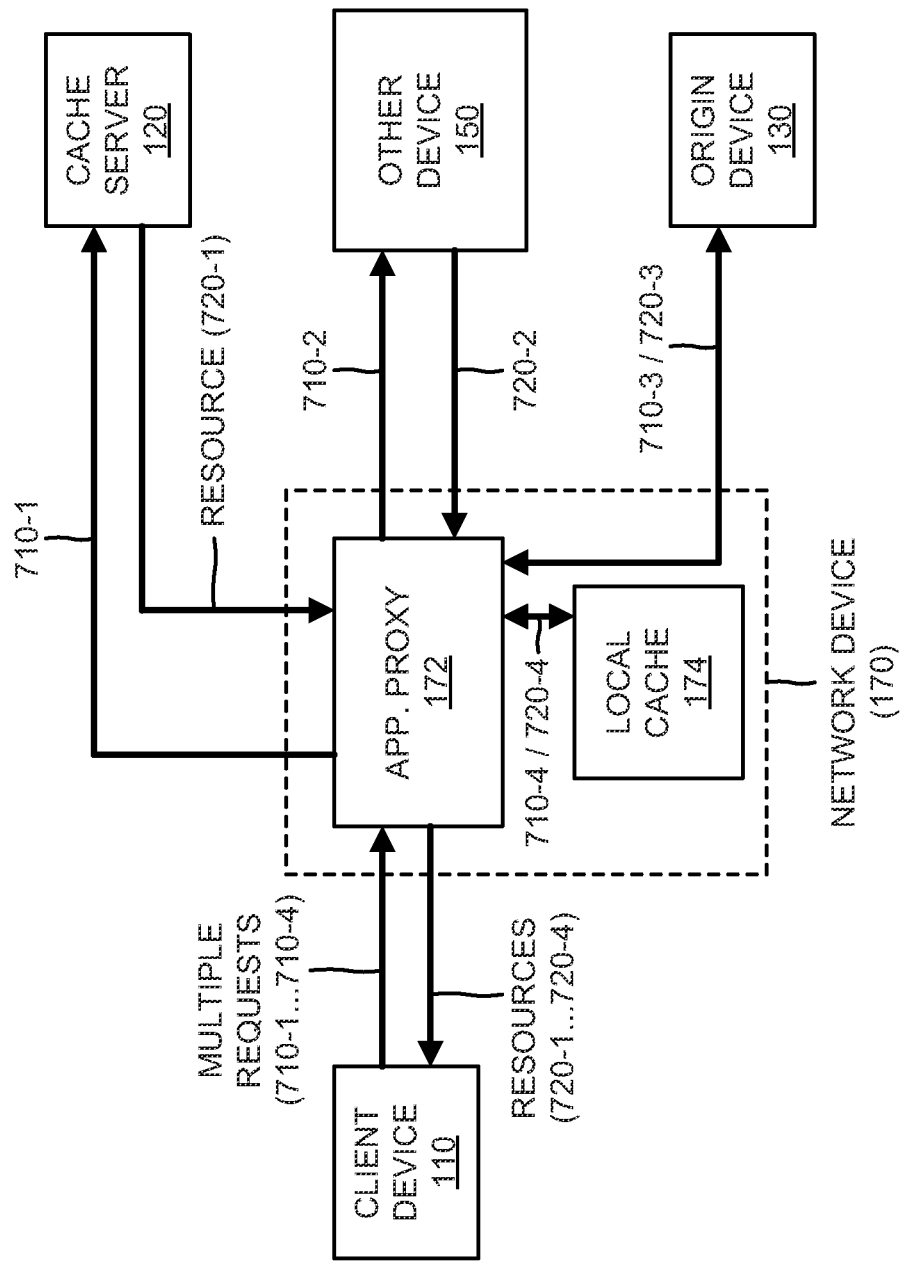

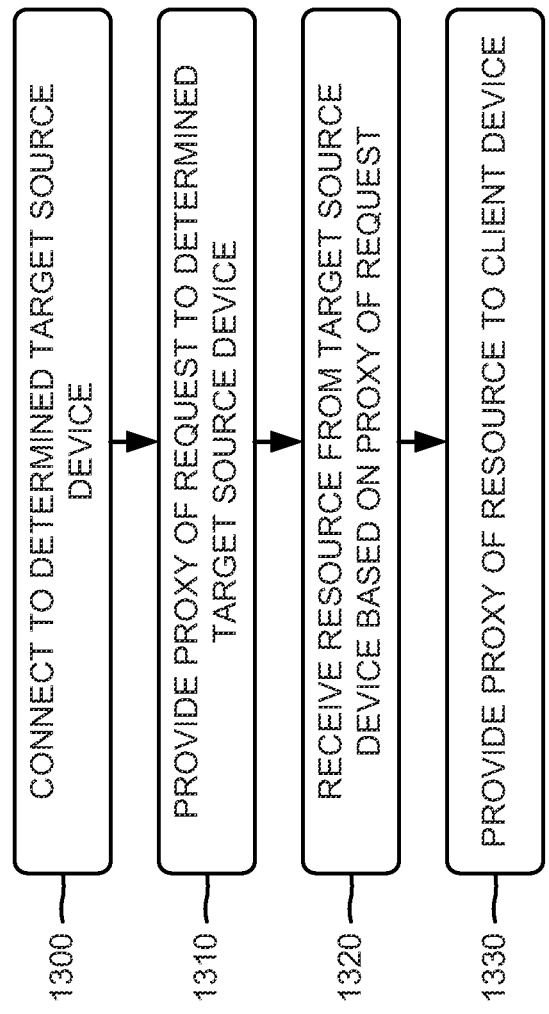

ROUTING PROXY FOR RESOURCE REQUESTS AND RESOURCES

BACKGROUND

A service provider is an entity (e.g., a business or an organization) that sells bandwidth provided by or access to a network (e.g., the Internet, a data network, a telecommunication network, etc.) associated with the service provider. Service providers may include telecommunications companies, data carriers, wireless communications providers, Internet service providers, cable television operators offering high-speed Internet access, etc. The rapid growth in the use of content, such as, for example, video, audio, images, and software downloads, is creating much higher bandwidth demands on service providers, with sharp peaks around viral content and events.

The content may be served to a client device from servers, such as origin servers, mirror servers, cache servers, etc., installed across a service provider's network. A client device may request access to such content using Internet protocols, such as a hypertext transfer protocol (HTTP), a real time messaging protocol (RTMP), etc. When the client device requests access to the content, the request must be routed to an appropriate server in the network. Routing the request takes into consideration several factors, such as improving the client device's experience (e.g., latency, speed of content transfer, etc.), cost and scalability of the network and content delivery infrastructure, etc. However, routing requests to appropriate servers is becoming more and more problematic for service providers since the complexity and load variability of service provider networks are increasing. Furthermore, the number and type of client devices, as well as the amount of content, are rapidly growing. In addition, service providers need to federate their services in order to offer a worldwide solution.

In order to address such problems, service providers currently deploy different types of solutions, such as a domain name system (DNS)-based solution, a border gateway protocol (BGP)-based solution, and an application level-based solution. Each solution provides an overlay on top of existing network routing infrastructure with manual provisioning. Manual provisioning involves the service provider advertising Internet protocol (IP) addresses of servers. For larger types of content (e.g., video, downloads, etc.), the solutions do not provide any opportunity to further optimize routing within the context of a single request. The solutions also do not function well in an environment where service providers need to federate their services.

In the DNS-based solution, a client device typically performs a DNS lookup to resolve a domain name to an IP address. A DNS service is specialized to dynamically select a server IP address based on factors like geo-locality, server load, content location, etc. However, the DNS-based solution provides for coarse-grain routing at only the domain level.

In the BGP-based solution, a given server IP address is supported in multiple locations. For example, each different region may include a server with the same IP address, and the servers may advertise the IP address. However, the BGP-based solution provides for coarse-grain routing at only the server level, and does not handle network problems (e.g., congestion, server failure, etc.) particularly well.

With the application level-based solution, a server can redirect, via, for example, in the HTTP protocol, a client device to a different server. For example, some service providers deploy content servers in their networks at the application level. The application level-based solution may be performed by explicitly routing (e.g., via DNS or BGP) a content request to a content router implemented at the application level. Another example of application level routing includes a portal server embedding different uniform resource locators (URLs) in a HyperText Markup Language (HTML) page, returned by the portal server, based on where a content request originates.

However, the application level-based solution increases latency for the client device due to the extra routing and connection setup associated with the content server. Furthermore, the application level-based solution is difficult to scale, and the content server may become a bottleneck for a network if all requests must be routed to the content server.

SUMMARY

According to one aspect, a method, performed by a computing device, may include: receiving, by the computing device and from a client device, a request for a resource, where the request provides an identifier of the client device; selecting, by the computing device, a target device for the resource; connecting the computing device with the selected target device; providing, by the computing device, a proxy of the request to the selected target device, where the proxy of the request hides the identifier of the client device; receiving, by the computing device, the resource from the selected target device, where the resource provides an identifier of the target device; and providing, by the computing device, a proxy of the resource to the client device, where the proxy of the resource hides the identifier of the target device.

According to another aspect, a network device may include a processor to: receive, from a client device, a request for a resource, where the request provides an identifier of the client device, select a target device for the resource, connect the network device with the selected target device, provide a proxy of the request to the selected target device, where the proxy of the request includes the request and substitutes an Internet protocol (IP) address of the network device for the identifier of the client device, receive the resource from the selected target device, where the resource provides an identifier of the target device, and provide a proxy of the resource to the client device, where the proxy of the resource includes the resource and substitutes the IP address of the network device for the identifier of the target device.

According to still another aspect, one or more non-transitory computer-readable media may store instructions executable by one or more processors of an edge device. The media may include one or more instructions to receive, from a client device, a request for a resource, where the request provides an identifier of the client device; one or more instructions to select a target device for the resource from multiple server devices storing resources and a local cache associated with the edge device; one or more instructions to provide a proxy of the request to the selected target device, where the proxy of the request hides the identifier of the client device; one or more instructions to receive the resource from the selected target device, where the resource provides an identifier of the target device; and one or more instructions to provide a proxy of the resource to the client device, where the proxy of the resource hides the identifier of the target device.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 5A and 5B are diagrams of further example operations capable of being performed by an example portion of the network depicted in FIG. 1;

FIG. 6 is a diagram of still further example operations capable of being performed by an example portion of the network illustrated in FIG. 1;

FIG. 7 is a diagram of example operations capable of being performed by an example portion of the network depicted in FIG. 1;

FIGS. 10-13 are flow charts of an example process for providing network integrated dynamic resource routing according to an implementation described herein.

DETAILED DESCRIPTION

The following detailed description refers to the accompanying drawings. The same reference numbers in different drawings may identify the same or similar elements.

Systems and/or methods described herein may integrate resource routing into an infrastructure of a core network, such as a service provider network, by adding application level intelligence in an edge network device of the core network. The application level intelligence may include an application proxy that terminates connections for a given application associated with all or a subset of client device requests for resources. For each resource request, the application proxy may determine a target server that stores resources, may connect to the determined server, and may proxy the resource request and a returned resource between the client device and the determined server.

In an example implementation, the systems and/or methods may receive, from a client device, a request for a resource, and may determine, based on IP information of the request, whether to terminate a connection for the request. If the connection for the request is not terminated, the request may be forwarded to a core network, such as a service provider network, for additional routing. If the connection for the request is terminated, a target source device for the resource may be determined, and the request may be provided to the determined target source device. The resource may be received from the target source device, and may be provided to the client device.

Figure 1:
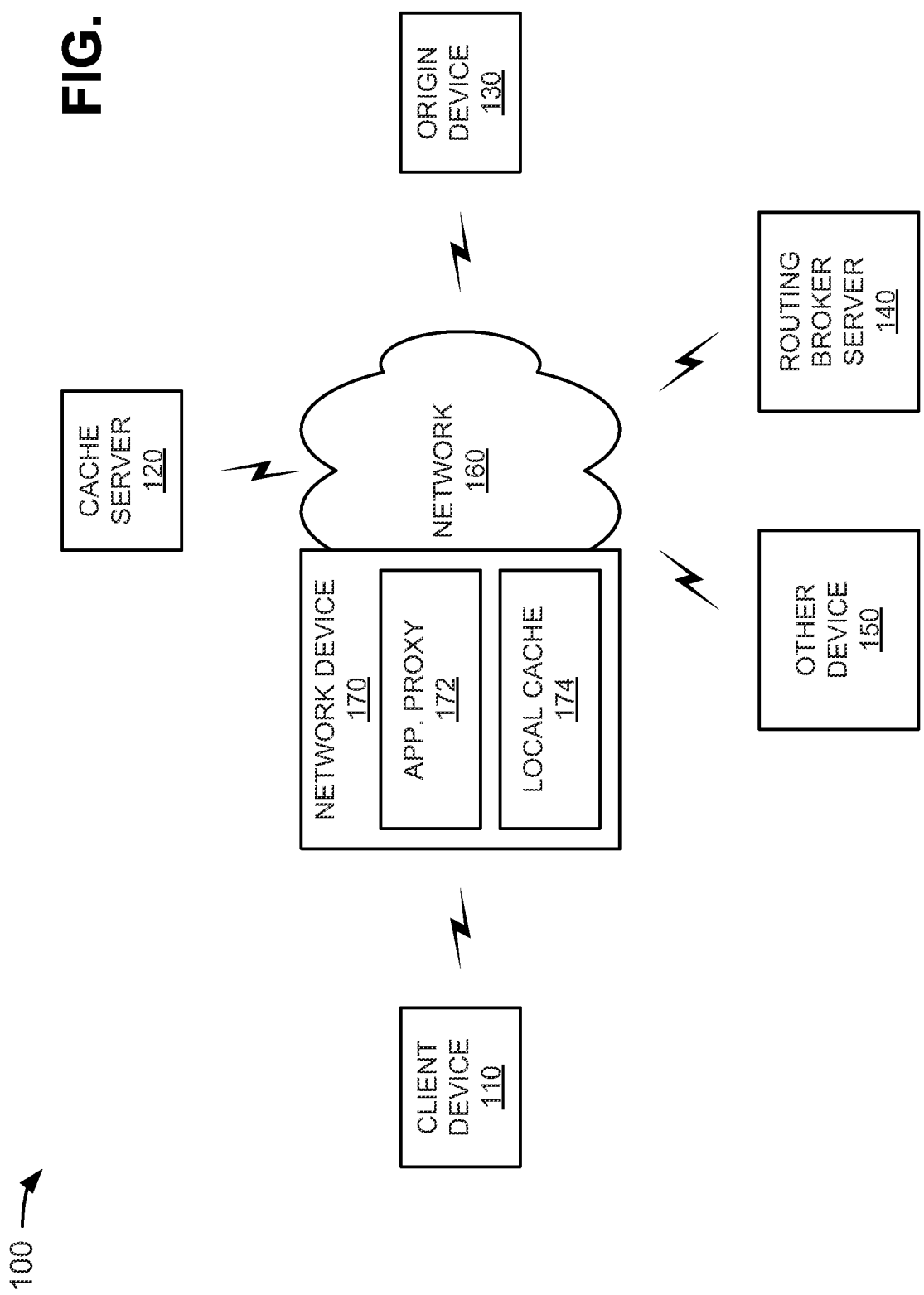
FIG. 1 is a diagram of an example network in which systems and/or methods described herein may be implemented.

FIG. 1 is a diagram of an example network 100 in which systems and/or methods described herein may be implemented. As illustrated, network 100 may include a client device 110; a cache server device 120 (referred to herein as "cache server 120"); an origin device 130, a routing broker server device 140 (referred to herein as "routing broker server 140"); another device 150; a network 160; and a network device 170 provided in or attached to network 160. A shown in FIG. 1, network device 170 may include an application proxy 172 and a local cache 174.

Devices of network 100 may interconnect via wired and/or wireless connections or links. A single client device 110, cache server 120, origin device 130, routing broker server 140, other device 150, network 160, and network device 170 have been illustrated in FIG. 1 for simplicity. In practice, there may be additional client devices 110, cache servers 120, origin devices 130, routing broker servers 140, other devices 150, networks 160, and/or network devices 170. Also, in some instances, one or more of the devices of network 100 may perform one or more tasks described as being performed by another one or more of the devices of network 100.

Client device 110 may include any device that is capable of accessing cache server 120, origin device 130, and/or other device 150 via network 160 and/or network device 170. For example, client device 110 may include a radiotelephone, a personal communications system (PCS) terminal that may combine a cellular radiotelephone with data processing and data communications capabilities, a personal digital assistant (PDA) that can include a radiotelephone, a pager, Internet/intranet access, etc., a wireless device (e.g., a wireless telephone), a smart phone, a workstation computer, a laptop computer, a personal computer, or another type of computation or communication device.

Cache server 120 may include one or more server devices, or other types of computation or communication devices, that gather, process, search, and/or provide information in a manner described herein. In one example implementation, cache server 120 may act as an intermediary for requests from client device 110 seeking resources from origin device 130. The term resources, as used herein, is intended to be broadly construed to include content, such as video, audio, images, software downloads, etc.; services, such as delivering high-definition and user-generated content, consumer and business news and information services, an email system, etc.; and/or a combination of content and services. Client device 110 may connect to cache server 120, via network 160 and/or network device 170, and may request some resource available from origin device 130. Cache server 120 may evaluate the request (e.g., according to filtering rules, such as filtering traffic by IP address or protocol). If the request is validated, cache server 120 may provide the requested resource by connecting to origin device 130 and requesting the resource on behalf of client device 110. Cache server 120 may serve the request without contacting origin device 130. In this case, cache server 120 may cache (or store) a particular resource previously requested from origin device 130, and may provide the particular resource to client device 110, via network device 170, without involving origin device 130.

Origin device 130 may include one or more server devices, or other types of computation or communication devices, that gather, process, search, and/or provide resources in a manner described herein. In one example implementation, origin device 130 may include resources that may be accessed by client device 110 via network 160 and/or network device 170. In one example, origin device 130 may provide resources to client device 110 (e.g., via network 160 and/or network device 170). Alternatively, origin device 130 may provide particular resources to cache server 120 for storage. Cache server 120 may store the particular resources so that cache server 120 may provide the particular resources to client device 110, when requested by client device 110, and without involving origin device 130.

Routing broker server 140 may include one or more server devices, or other types of computation or communication devices, that gather, process, search, and/or provide information in a manner described herein. In one example implementation, routing broker server 140 may receive information from a variety of sources, and may store the information. For example, routing broker server 140 may receive information from local cache 174 (e.g., information about the availability of local cache 174, information identifying resources stored in local cache 174, etc.); information from network 160 (e.g., information about the availability of network 160 and/or network device 170, network topology and costs, etc.); information from cache server 120 (e.g., information about the availability of cache server 120, information identifying resources stored in cache server 120, etc.); information from other device 150 (e.g., information about the availability of other device 150, information identifying resources stored by other device 150, Application-Layer Traffic Optimization (ALTO) service (e.g., as set forth in Request for Comments (RFC) 5693) information identifying servers with resources provided by service providers other than the service provider associated with network 100, etc.); and/or information from origin device 130 (e.g., information about the availability of origin device 130, information identifying resources stored in origin device 130, etc.).

In one example, network device 170 may query routing broker server 140 for a location of a target device to serve resource request (e.g., provided by client device 110). Routing broker server 140 may receive the query, may determine the target device to serve the resource request, and may provide location information, such as an IP address, of the target device to network device 170. For example, routing broker server 140 may receive the query from network device 170, and may determine that origin device 130 is the target device since origin device 130 is the closest device with the requested resource. Accordingly, routing broker server 140 may provide location information, such as an IP address, of origin device 130 to network device 170.

Other device 150 may include one or more server devices, or other types of computation or communication devices, that gather, process, search, and/or provide information in a manner described herein. In one example implementation, other device 150 may be associated with federated service provider networks that provide resources to network 100 in case of failure of network 100 or components of network 100. Other device 150 may store ALTO service information identifying servers with resources provided by such federated service provider networks. In an example implementation, other device 150 may include resources that may be accessed by client device 110 via network 160 and/or network device 170, in the event of failure of network 100 or components of network 100.

Network 160 may include a service provider network, such as a local area network (LAN); a wide area network (WAN); a metropolitan area network (MAN); a telephone network (e.g., the Public Switched Telephone Network (PSTN) or a cell network); the Internet; or a combination of networks.

Network device 170 may include a traffic transfer device, such as a gateway, a router, a switch, a firewall, a network interface card (NIC), a hub, a bridge, a proxy server, an optical add-drop multiplexer (OADM), or some other type of device that processes and/or transfers traffic (e.g., packets). In one implementation, network device 170 may be an edge network device that provides an entry point to or an exit point from network 160. In one example, network device 170 may enable client device 110, cache server 120, origin device 130, routing broker server 140, and/or other device 150 to communicate with one another. In another example, network device 170 may enable client device 110 to request and receive resources from cache server 120, origin device 130, and/or other device 150.

As further shown in FIG. 1, network device 170 may include application proxy 172 and local cache 174. Application proxy 172 may terminate connections for a given application associated with all or a subset of client device 110 requests for resources. Application proxy 172 may receive the resource requests substantially concurrently, at different times, etc. For each resource request, application proxy 172 may determine a target server (e.g., cache server 120, origin server 130, other device 150, or local cache 174) that stores resources. Application proxy 172 may connect to the determined server, and may proxy the resource request and a returned resource between client device 110 and the determined server.

In an example implementation, application proxy 172 may receive, from client device 110, a request for a resource, and may determine, based on IP information of the request, whether to terminate a connection for the request. If application proxy 172 determines that the connection for the request should not be terminated, application proxy 172 may forward the request to network 160 for additional routing. If application proxy 172 determines that the connection for the request should be terminated, application proxy 172 may terminate the connection for the request, and may determine a target source device (e.g., cache server 120, origin server 130, other device 150, or local cache 174) for the resource. Application proxy 172 may provide the request to the determined target source device, may receive the resource from the target source device, and may provide the resource to client device 110.

Local cache 174 may include one or more storage devices, such as magnetic and/or optical recording media and their corresponding drives, removable memory, a random access memory (RAM), a read only memory (ROM), etc. In one example implementation, local cache 174 may store resources that may be accessed by client device 110. Local cache 174 may store the resources so that local cache 174 may provide the resources to client device 110, when requested by client device 110, and without involving cache server 120, origin device 130, and/or other device 150. Further details of network device 170, application proxy 172, and local cache 174 are provided below in connection with, for example, FIGS. 3-9.

Although FIG. 1 shows example devices of network 100, in other implementations, network 100 may include fewer devices, different devices, differently arranged devices, or additional devices than depicted in FIG. 1.

Figure 2:
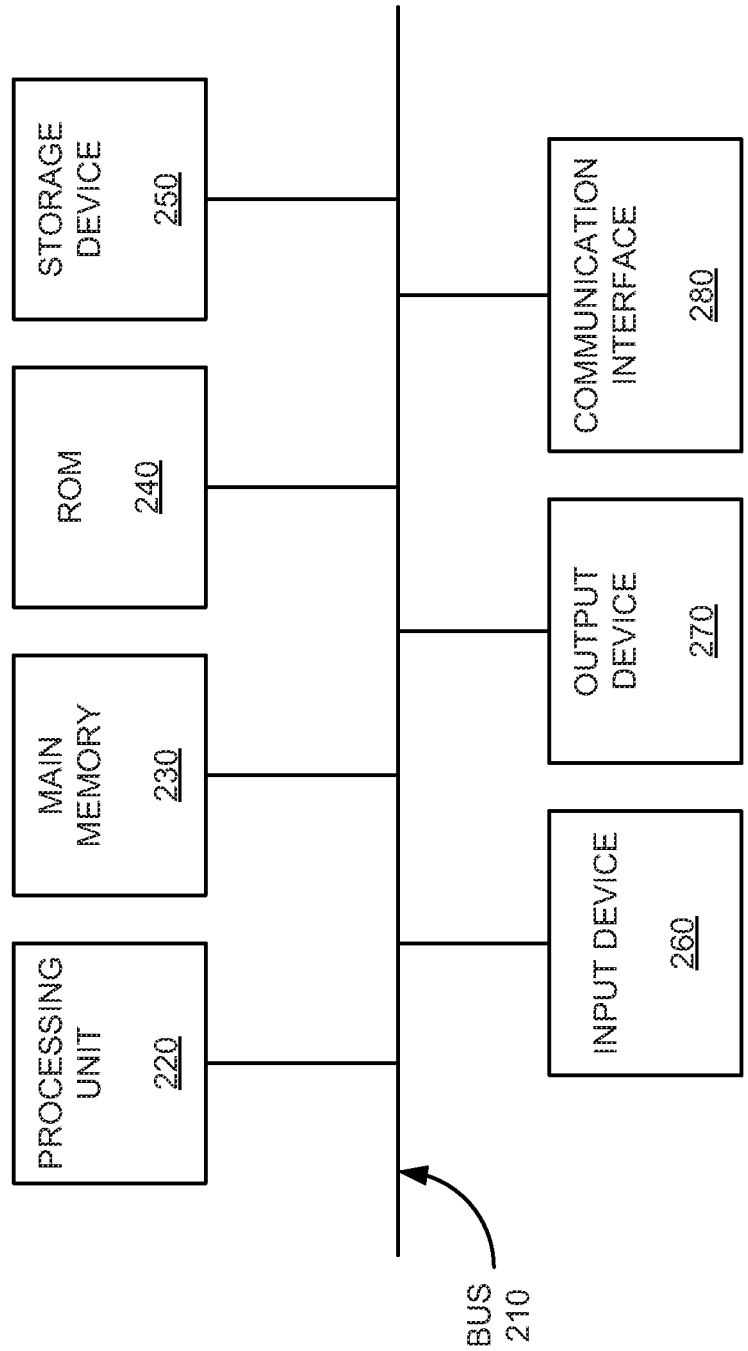
FIG. 2 is a diagram of example components of a client device, a cache server, an origin device, a routing broker server, or another device depicted in FIG. 1.

FIG. 2 is a diagram of example components of a device 200 that may correspond to client device 110, cache server 120, origin device 130, routing broker server 140, or other device 150 (FIG. 1). In some instances, device 200 may also correspond to network device 170 (FIG. 1). Each of client device 110, cache server 120, origin device 130, routing broker server 140, other device 150, or network device 170 may include one or more devices 200. As illustrated in FIG. 2, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, application-specific integrated circuit (ASICs), field-programmable gate arrays (FPGAs), or other types of processing units that interpret and execute instructions. Main memory 230 may include a RAM or another type of dynamic storage device that stores information and instructions for execution by processing unit 220. ROM 240 may include a ROM device or another type of static storage device that stores static information and/or instructions for use by processing unit 220. Storage device 250 may include a magnetic and/or optical recording medium and its corresponding drive, or a removable memory, such as a flash memory.

Input device 260 may include a mechanism that permits an operator to input information to device 200, such as a keyboard, a mouse, a switch, a button, voice recognition and/or biometric mechanisms, a touch screen, etc. Output device 270 may include a mechanism that outputs information to the operator, including a display, a speaker, a light emitting diode (LED), etc. Communication interface 280 may include any transceiver-like mechanism that enables device 200 to communicate with other devices and/or systems. For example, communication interface 280 may include mechanisms for communicating with another device or system via a network. In one implementation, communication interface 280 may include a wired interface, such as an Ethernet interface, or a wireless interface, such as radio frequency interface.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
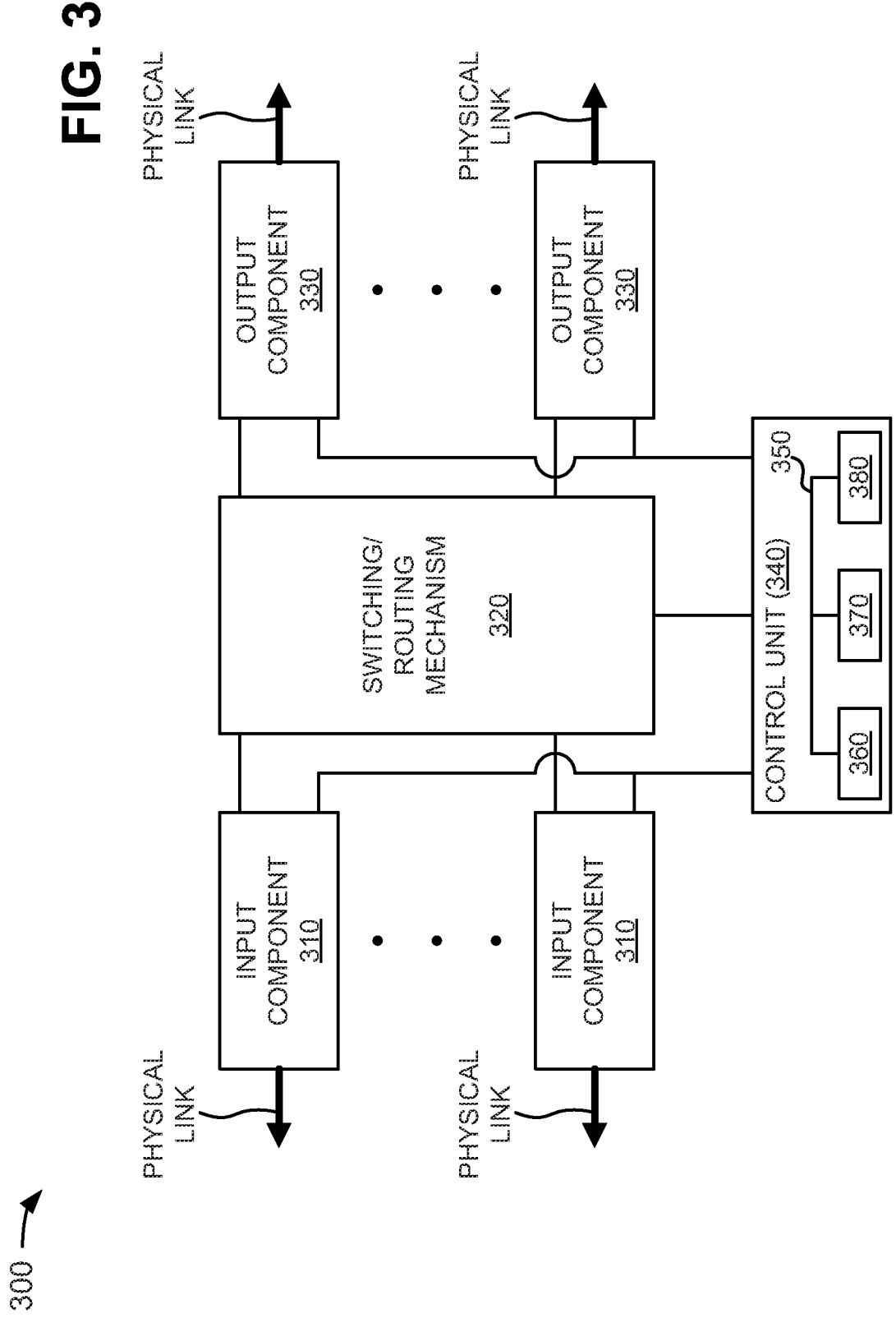
FIG. 3 is a diagram of example components of a network device depicted in FIG. 1.

FIG. 3 is a diagram of example components of a device 300 that may correspond to network device 170 (FIG. 1). In some instances, network device 170 may include one or more devices 300. As shown in FIG. 3, device 300 may include input components 310, a switching/routing mechanism 320, output components 330, and a control unit 340.

Input components 310 may be a point of attachment for physical links and may be a point of entry for incoming traffic, such as packets. Input components 310 may process incoming traffic, such as by performing data link layer encapsulation or decapsulation. In an example implementation, input components 310 may send and/or receive packets.

Switching/routing mechanism 320 may interconnect input components 310 with output components 330. Switching/routing mechanism 320 may be implemented using many different techniques. For example, switching/routing mechanism 320 may be implemented via busses, via crossbars, and/or with shared memories. The shared memories may act as temporary buffers to store traffic from input components 310 before the traffic is eventually scheduled for delivery to output components 330.

Output components 330 may store packets and may schedule packets for service on output physical links Output components 330 may include scheduling algorithms that support priorities and guarantees. Output components 330 may support data link layer encapsulation and decapsulation, and/or a variety of higher-level protocols. In an example implementation, output components 330 may send packets and/or receive packets.

Control unit 340 may use routing protocols and one or more forwarding tables for forwarding packets. Control unit 340 may connect with input components 310, switching/routing mechanism 320, and output components 330. Control unit 340 may compute a forwarding table, implement routing protocols, and/or run software to configure and manage device 300. Control unit 340 may determine routing for any packet whose destination address may not be found in the forwarding table.

In an example implementation, control unit 340 may include a bus 350 that may include a path that permits communication among a processor 360, a memory 370, and a communication interface 380. Processor 360 may include one or more processors, microprocessors, ASICs, FPGAs, or other types of processing units that may interpret and execute instructions. Memory 370 may include a RAM, a ROM device, a magnetic and/or optical recording medium and its corresponding drive, and/or another type of static and/or dynamic storage device that may store information and instructions for execution by processor 360. Memory 370 may also temporarily store incoming traffic (e.g., a header of a packet or an entire packet) from input components 310, for processing by processor 360, before a packet is directed back to switching/routing mechanism 320, transported by switching/routing mechanism 320, and eventually scheduled to be sent to output components 330. Communication interface 380 may include any transceiver-like mechanism that enables control unit 340 to communicate with other devices and/or systems.

As described herein, device 300 may perform certain operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software. For example, switching/routing operations of device 300 may be controlled via external agents using routing protocols (e.g., BGP).

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
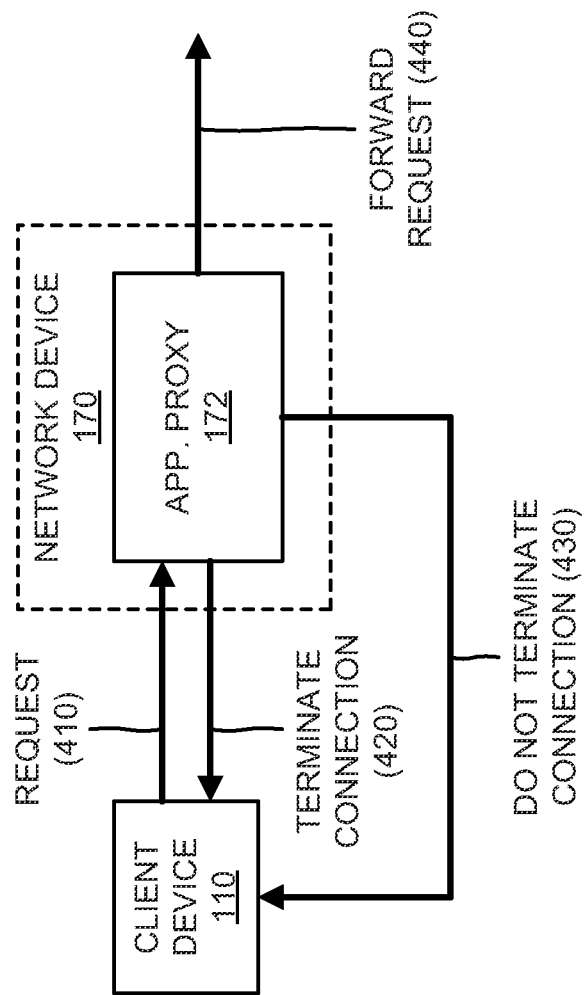
FIG. 4 is a diagram of example operations capable of being performed by an example portion of the network illustrated in FIG. 1.

FIG. 4 is a diagram of example operations capable of being performed by an example portion 400 of network 100. As shown, example network portion 400 may include client device 110, network device 170, and application proxy 172. Client device 110, network device 170, and application proxy 172 may include the features described above in connection with, for example, one or more of FIGS. 1-3.

As shown in FIG. 4, client device 110 may provide a request 410 for a resource to network device 170, and network device 170 may receive request 410 via application proxy 172. Application proxy 172 may receive request 410, and may determine, based on information provided in request 410, whether to terminate a connection (e.g., a transmission control protocol (TCP) connection) for request 410 at network device 170. In one example, the information provided in request 410 may include IP information, such as a destination IP address of request 410, an IP address of client device 110 (i.e., a source IP address of request 410), a destination port (e.g., a network address translation (NAT)) of request 410, etc. In one implementation, application proxy 172 may extract the destination IP address from request 410, may extract the IP address of client device 110 from request 410, and/or may extract the destination port from request 410. Application proxy 172 may determine, based on the extracted destination IP address, client device 110 IP address, and/or destination port, whether to terminate the connection for request 410 at network device 170.

As further shown in FIG. 4, if application proxy 172 decides to terminate the connection for request 410, based on the information provided in request 410, application proxy 172 may provide, to client device 110, an indication 420 that the connection is terminated. If application proxy 172 decides to not terminate the connection for request 410, based on the information provided in request 410, application proxy 172 may provide, to client device 110, an indication 430 that the connection is not terminated, and may forward request 410 to network 160 for additional routing, as indicated by reference number 440. In one example implementation, application proxy 172 may terminate connections (e.g., TCP connections) for a given application and for all or a subset of resource requests received from client device 110. In another example implementation, indication 430 may be omitted since request 410 may be terminated by another downstream device.

In one implementation, application proxy 172 may maintain or access a table (or other data structure) that provides a list of applications, client device IP addresses, source device IP addresses, etc. The information provided in table may be input by a network administrator to network device 170, may be generated by application proxy 172 based on prior traffic provided to or received by network device 170, etc. For example, if network device 170 receives a particular number of requests (e.g., that it greater than a threshold) from a particular client device 110, application proxy 172 may add the IP address of client device 110 to the table. In another example, if network device 170 retrieves a particular number resources (e.g., that is greater than a threshold) from a particular server, application proxy 172 may add the IP address of the particular server to the table.

Application proxy 172 may compare the information provided in request 410 to the information provided in the table, and may decide to terminate the connection for request 410 when the information provided in request 410 matches one or more items of information provided in the table. In one implementation, application proxy 172 may establish rules to determine whether to terminate a connection (e.g., if there is one match in the table, then terminate the connection; if there are two or more matches in the table then terminate the connection, etc.). In one example, if request 410 includes a destination IP address of origin device 130 and the table includes the destination IP address of origin device 130, application proxy 172 may decide to terminate the connection for request 410. In another example, if request includes a destination IP address of cache server 120 but does not include the IP address of client device 110, application proxy 172 may decide to not terminate the connection for request 410.

Although FIG. 4 shows example components of network portion 400, in other implementations, network portion 400 may include fewer components, different components, differently arranged components, or additional components than depicted in FIG. 4. Alternatively, or additionally, one or more components of network portion 400 may perform one or more other tasks described as being performed by one or more other components of network portion 400.

Figure 5A:
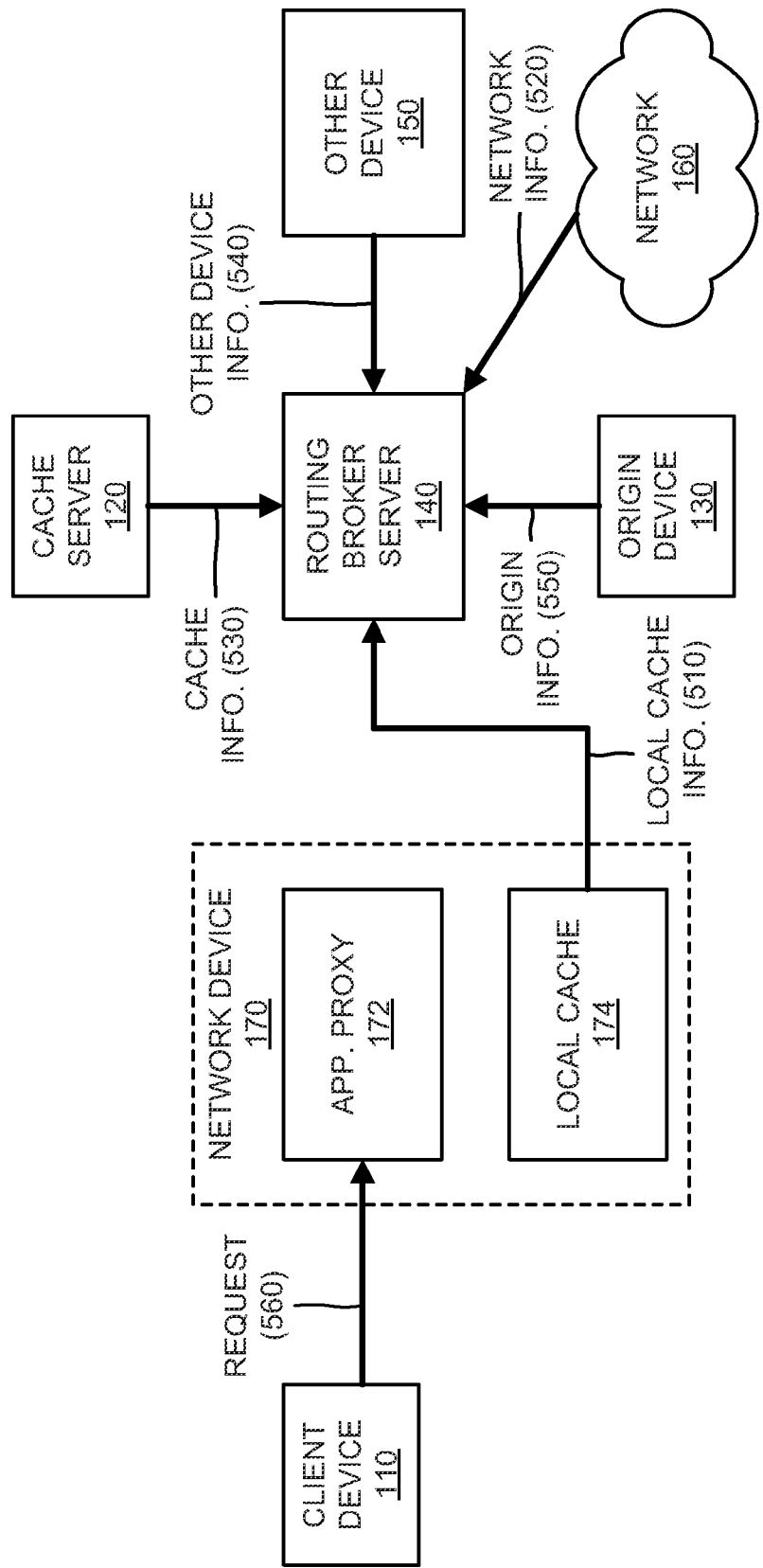

FIGS. 5A and 5B are diagrams of further example operations capable of being performed by an example portion 500 of network 100. As shown in FIGS. 5A and 5B, example network portion 500 may include client device 110, cache server 120, origin device 130, routing broker server 140, other device 150, network 160, and network device 170. Client device 110, cache server 120, origin device 130, routing broker server 140, other device 150, network 160, and network device 170 may include the features described above in connection with, for example, one or more of FIGS. 1-4.

As further shown in FIG. 5A, routing broker server 140 may receive information from one or more sources of network portion 500. For example, local cache 174 may provide local cache information 510 to routing broker server 140. Local cache information 510 may include information about the availability of local cache 174, information identifying resources stored in local cache 174, information about the size of local cache 174, etc. In another example, network 160 may provide network information 520 to routing broker server 140. Network information 520 may include information about the availability of network 160 and/or components of network 160, topology and costs associated with network 160, bandwidth available to network 160, preferred client devices of network 160, etc. In still another example, cache server 120 may provide cache information 530 to routing broker server 140. Cache information 530 may include information about the availability of cache server 120, information identifying resources stored in cache server 120, information about the load on cache server 120, etc. In one example implementation, routing broker server 140 may enable new cache servers to be added to network 100 without having to explicitly configure the new cache servers into the routing decision, as is required by existing schemes. The new cache servers may provide cache information (e.g., similar to cache information 530) to routing broker server 140.

In a further example, other device 150 may provide other device information 540 to routing broker server 140. Other device information 540 may include information about the availability of other device 150, information identifying resources stored in other device 150, information about the service provider(s) associated with other device 150, ALTO service information identifying servers with resources provided by the service provider(s) associated with other device 150, etc. In still a further example, origin device 130 may provide origin information 550 to routing broker server 140. Origin information 550 may include information about the availability of origin device 130, information identifying resources stored in origin device 130, information about the load on origin device 130, etc.

Routing broker server 140 may receive local cache information 510, network information 520, cache information 530, other device information 540, and/or origin information 550, and may store (e.g., in main memory 230, ROM 240, and/or storage device 250, FIG. 2) local cache information 510, network information 520, cache information 530, other device information 540, and/or origin information 550. As further shown in FIG. 5A, client device 110 may provide a request 560 for a resource to network device 170, and network device 170 may receive request 560 via application proxy 172. Request 560 may include IP information, such as a destination IP address of request 560, an IP address of client device 110 (i.e., a source IP address of request 560), a destination port of request 560, etc. In one example, request 560 may include a HTTP GET request (e.g., requesting resources), a domain name, and/or a uniform resource locator (URL). Application proxy 172 may receive request 560, and may determine, based on information provided in request 560, whether to terminate a connection for request 560 at network device 170, as described above in connection with FIG. 4.

If application proxy 172 terminates the connection for request 560 at network device 170, application proxy 172 may determine a target source device for the resource requested by request 560. Application proxy 172 may determine the target source device in a number of ways. For example, as shown in FIG. 5B, application proxy 172 may provide a query 570 to routing broker server 140. Query 570 may include a request for a location of a target source device that stores the resource requested by request 560. In one implementation, query 570 may include information associated with request 560, such as the resource requested by request 560, the domain name of request 560, the URL of request 560, etc.

Routing broker server 140 may receive query 570, and may determine, based on query 570, the target source device for the resource requested by request 560. In one example, routing broker server 140 may determine the target source device based on a variety of factors, such as conditions of network 160 (e.g., bandwidth of network 160, load on network 160, etc.), a physical location of the target source device in relation to client device 110 (e.g., a device located closer to client device 110 may be selected before a device that is located further from client device 110), etc. After determining the target source device, routing broker server 140 may provide a location 580 (e.g., an IP address) of the target source device to application proxy 172.

In one example, the domain name, included in request 560, may be hosted by a particular server (e.g., origin device 130) while the URL, included in request 560, may identify a resource that is hosted by a different server (e.g., cache server 120). In such a scenario, routing broker server 140 may determine that cache server 120 is the target source device since the resource requested by request 560 is hosted by cache server 120. In contrast, in DNS-based systems, request 560 would be unnecessarily routed to origin device 130 first due to the domain name of request 560.

In one example implementation, prior to generating query 570, application proxy 172 may determine whether the requested resource is stored in local cache 174. In one example, application proxy 172 may maintain a table (or other data structure) that provides a list of resources stored in local cache 174. Application proxy 172 may scan the table to determine whether the requested resource is stored in local cache 174. If application proxy 172 determines that the requested resource is stored in local cache 174, application proxy 172 may retrieve the requested resource from local cache 174. For example, application proxy 172 may provide request 560 to local cache 174, and local cache 174 may retrieve a resource 590 requested by request 560. Local cache 174 may provide resource 590 to application proxy 172, and application proxy 172 may forward resource 590 to client device 110.

If application proxy 172 determines that resource 590 is not stored in local cache 174, application proxy 172 may provide query 570 to routing broker server 140. Application proxy 172 may receive, from routing broker server 140 and based on query 570, location 580 of the target source device (e.g., cache server 120, origin device 130, and/or other device 150). Application proxy 172 may utilize location 580 to connect with the target source device and to retrieve the requested resource from the target source device.

As further shown in FIG. 5B, in one example, if location 580 identifies an IP address of cache server 120, application proxy 172 may provide request 560 (e.g., which may include the IP address of client device 110) to cache server 120, and cache server 120 may retrieve resource 590 requested by request 560. Cache server 120 may provide resource 590 to application proxy 172, and application proxy 172 may forward resource 590 (e.g., which may include the IP address of cache server 120) to client device 110. In another example, if location 580 identifies an IP address of origin device 130, application proxy 172 may provide request 560 (e.g., which may include the IP address of client device 110) to origin device 130, and origin device 130 may retrieve resource 590 requested by request 560. Origin device 130 may provide resource 590 to application proxy 172, and application proxy 172 may forward resource 590 (e.g., which may include the IP address of origin device 130) to client device 110. In still another example, if location 580 identifies an IP address of other device 150, application proxy 172 may provide request 560 (e.g., which may include the IP address of client device 110) to other device 150, and other device 150 may retrieve resource 590 requested by request 560. Other device 150 may provide resource 590 to application proxy 172, and application proxy 172 may forward resource 590 (e.g., which may include the IP address of other device 150) to client device 110.

Although FIGS. 5A and 5B show example components of network portion 500, in other implementations, network portion 500 may include fewer components, different components, differently arranged components, or additional components than depicted in FIGS. 5A and 5B. Alternatively, or additionally, one or more components of network portion 500 may perform one or more other tasks described as being performed by one or more other components of network portion 500. For example, network device 170, via application proxy 172, may perform one or more functions (e.g., determining a target source device) described as being performed by routing broker server 140.

FIG. 6 is a diagram of still further example operations capable of being performed by an example portion 600 of network 100. As shown, example network portion 600 may include client device 110, cache server 120, origin device 130, other device 150, network device 170, application proxy 172, and local cache 174. Client device 110, cache server 120, origin device 130, other device 150, network device 170, application proxy 172, and local cache 174 may include the features described above in connection with, for example, one or more of FIGS. 1-5B.

In one implementation, FIG. 6 may depict how network device 170 proxies requests from client device 110 to target source devices, and further proxies resources, retrieved from the target source devices, to client device 110. By proxying the requests and the resources, network device 170 may ensure that client device 110 and the target source devices are transparent to each other or that cache server 120 is transparent to client device 110 and origin device 130. For example, client device 110 may be transparent to origin device 130 because network device 170 may use its own IP address, or may spoof addresses of client device 110 and/or origin device 130, to exchange information (e.g., packets) between client device 110 and origin device 130. In another example, network device 170 may use an IP address of client device 110 and/or origin device 130 to exchange information with cache server 120 (i.e., so that cache server 120 is not visible to client device 110 and/or origin device 130). Such an arrangement may ensure that client device 110, cache server 120, and/or origin device 130 are not visible to each other, which may enhance security for client device 110 and/or the target source devices.

As further shown in FIG. 6, client device 110 may provide a request 610 for a resource to network device 170, and network device 170 may receive request 610 via application proxy 172. Request 610 may include IP information, such as a destination IP address of request 610, an IP address of client device 110 (i.e., a source IP address of request 610), a destination port of request 610, etc. Application proxy 172 may receive request 610, and may determine, based on information provided in request 610, whether to terminate a connection for request 610 at network device 170. If application proxy 172 terminates the connection for request 610 at network device 170, application proxy 172 may determine a target source device best suited to serve the resource requested by request 610. For example, application proxy 172 may determine the target source device to be cache server 120, origin device 130, other device 150, and/or local cache 174. In one example implementation, application proxy 172 may determine the target source device for request 610 in the manner described above in connection with FIGS. 5A and 5B.

Application proxy 172 may connect to the determined target source device, and may provide a proxy 620 of request 610 to the determined target source device. Proxy request 620 may include the features of request 610, but may be transparently provided by spoofing an IP address of client device 110 to the target source device. Via proxy request 620, client device 110 may be transparent to the target source device because network device 170 may use its own IP address, or may spoof the addresses of client device 110, to send information to the target source device. This may enable client device 110 to securely communicate with the target source device (i.e., without the target source device gaining access to the IP address of client device 110).

In one example, if the target source device corresponds to cache server 120, application proxy 172 may provide proxy request 620 to cache server 120, and cache server 120 may retrieve a resource 630 requested by proxy request 620. Cache server 120 may provide resource 630 to application proxy 172. In another example, if the target source device corresponds to origin device 130, application proxy 172 may provide proxy request 620 to origin device 130, and origin device 130 may retrieve resource 630 requested by proxy request 620. Origin device 130 may provide resource 630 to application proxy 172. In still another example, if the target source device corresponds to other device 150, application proxy 172 may provide proxy request 620 to other device 150, and other device 150 may retrieve resource 630 requested by proxy request 620. Other device 150 may provide resource 630 to application proxy 172. In a further example, if the target source device corresponds to local cache 174, application proxy 172 may provide request 610 (i.e., no proxy may be required) to local cache 174, and local cache 174 may retrieve resource 630 requested by request 610. Local cache 174 may provide resource 630 to application proxy 172.

Application proxy 172 may receive resource 630 from one of the target source devices described above, and may provide a proxy 640 of resource 630 to client device 110. Proxy resource 640 may include the features of resource 630, but may be transparently provided by spoofing an IP address of the target source device to client device 110. Via proxy resource 640, the target source device may be "transparent" to client device 110 because network device 170 may use its own IP address to send information to client device 110. This may enable the target source device to securely communicate with client device 110 (i.e., without client device 110 gaining access to the IP address of the target source device).

Although FIG. 6 shows example components of network portion 600, in other implementations, network portion 600 may include fewer components, different components, differently arranged components, or additional components than depicted in FIG. 6. Alternatively, or additionally, one or more components of network portion 600 may perform one or more other tasks described as being performed by one or more other components of network portion 600.

FIG. 7 is a diagram of example operations capable of being performed by an example portion 700 of network 100. As shown, example network portion 700 may include client device 110, cache server 120, origin device 130, other device 150, network device 170, application proxy 172, and local cache 174. Client device 110, cache server 120, origin device 130, other device 150, network device 170, application proxy 172, and local cache 174 may include the features described above in connection with, for example, one or more of FIGS. 1-6.

As shown in FIG. 7, client device 110 may provide, to network device 170, multiple requests 710-1, ..., 710-4 for multiple resources (collectively referred to as "multiple requests 710"), associated with a single connection, and network device 170 may receive multiple requests 710 via application proxy 172. In one implementation, multiple requests 710 may be provided sequentially via the single connection. In other implementations, multiple requests 710 may be provided at different times via the single connection. Application proxy 172 may receive multiple requests 710, and may determine, based on information provided in multiple requests 710, whether to terminate the connection for multiple requests 710 at network device 170. In one implementation, application proxy 172 may determine whether to terminate the connection for multiple requests 710 in the manner described above in connection with FIG. 4. If application proxy 172 decides to not terminate the connection for multiple requests 710, application proxy 172 may forward multiple requests 410 to network 160 for additional routing.

If application proxy 172 terminates the connection for multiple requests 710 at network device 170, application proxy 172 may determine target source devices best suited to serve the resources requested by multiple requests 710. In one example implementation, application proxy 172 may select one or more target source devices for multiple requests 710. In another example implementation, application proxy 172 may select a separate target source device for each of multiple requests 710. For example, application proxy 172 may select cache server 120 to be the target source device for request 710-1, may select other device 150 to be the target source device for request 710-2, may select origin device 130 to be the target source device for request 710-3, and/or may select local cache 174 to be the target source device for request 710-4. In one example, application proxy 172 may select the target source devices for multiple requests 710 in the manner described above in connection with FIGS. 5A and 5B.

Application proxy 172 may provide request 710-1 to cache server 120, and cache server 120 may retrieve a resource 720-1 requested by request 710-1. Cache server 120 may provide resource 720-1 to application proxy 172. Application proxy 172 may provide request 710-2 to other device 150, and other device 150 may retrieve a resource 720-2 requested by request 710-2. Other device 150 may provide resource 720-2 to application proxy 172. Application proxy 172 may provide request 710-3 to origin device 130, and origin device 130 may retrieve a resource 720-3 requested by request 710-3. Origin device 130 may provide resource 720-3 to application proxy 172. Application proxy 172 may provide request 710-4 to local cache 174, and local cache 174 may retrieve a resource 720-4 requested by request 710-4. Local cache 174 may provide resource 720-4 to application proxy 172. Application proxy 172 may receive resources 720-1, . . . , 720-4, and may provide resources 720-1, . . . , 720-4 to client device 110.

Although FIG. 7 shows example components of network portion 700, in other implementations, network portion 700 may include fewer components, different components, differently arranged components, or additional components than depicted in FIG. 7. Alternatively, or additionally, one or more components of network portion 700 may perform one or more other tasks described as being performed by one or more other components of network portion 700.

Figure 8:
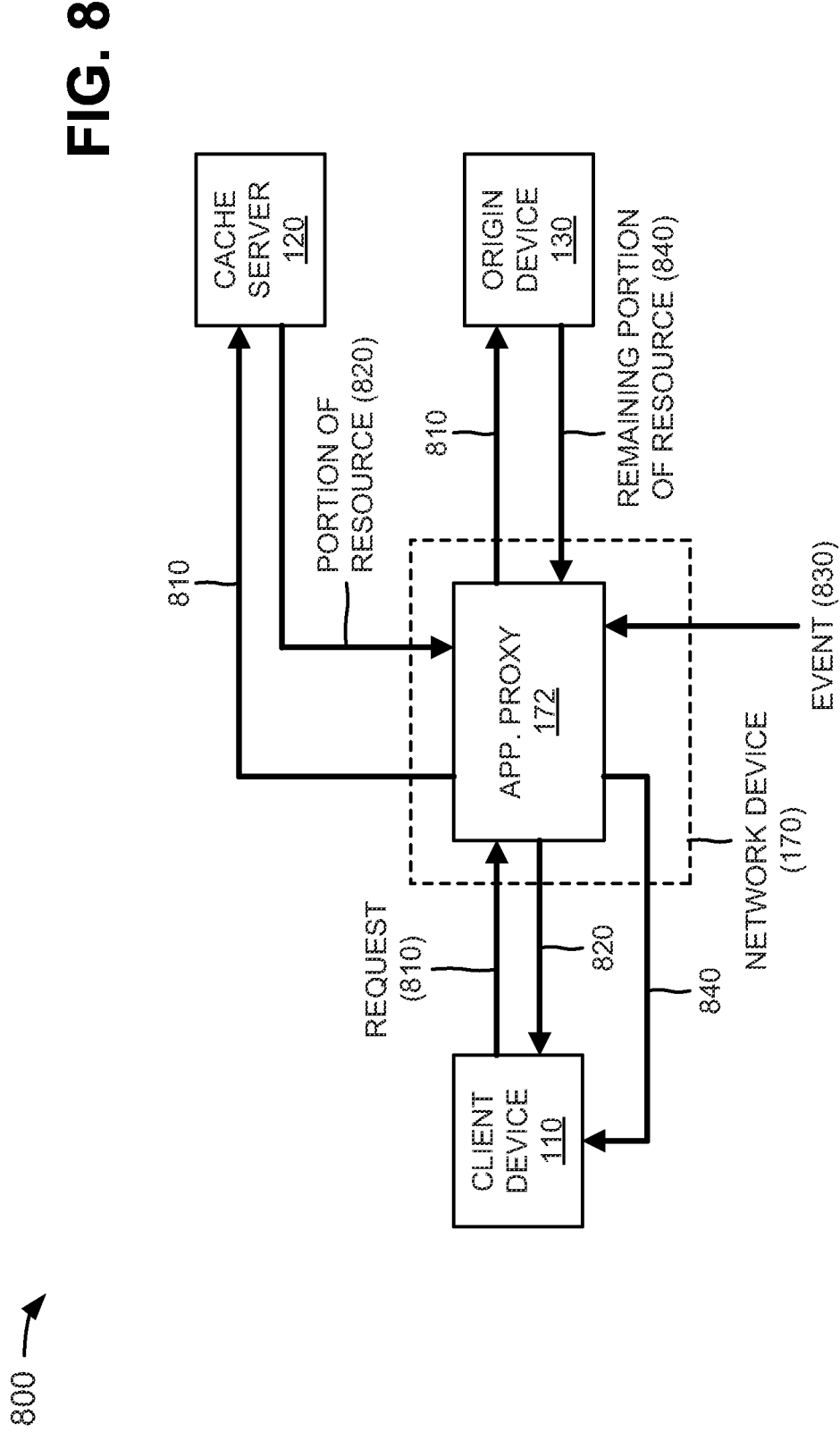
FIG. 8 is a diagram of further example operations capable of being performed by an example portion of the network illustrated in FIG. 1.

FIG. 8 is a diagram of further example operations capable of being performed by an example portion 800 of network 100. As shown, example network portion 800 may include client device 110, cache server 120, origin device 130, network device 170, and application proxy 172. Client device 110, cache server 120, origin device 130, network device 170, and application proxy 172 may include the features described above in connection with, for example, one or more of FIGS. 1-7.

As shown in FIG. 8, client device 110 may provide a request 810 for a resource to network device 170, and network device 170 may receive request 810 via application proxy 172. Request 810 may include IP information, such as a destination IP address of request 810, an IP address of client device 110 (i.e., a source IP address of request 810), a destination port of request 810, etc. Application proxy 172 may receive request 810, and may determine, based on information provided in request 810, whether to terminate a connection for request 810 at network device 170. If application proxy 172 terminates the connection for request 810 at network device 170, application proxy 172 may determine a target source device best suited to serve the resource requested by request 810. For example, application proxy 172 may determine the target source device to be cache server 120.

Application proxy 172 may provide request 810 to cache server 120, and cache server 120 may retrieve a portion 820 of a resource requested by request 810. Cache server 120 may provide resource portion 820 to application proxy 172. However, before the entire resource requested by request 810 is received by application proxy 172 from cache server 120, application proxy 172 may receive an indication 830 of an event. Event indication 830 may provide information regarding changing conditions in a network (e.g., network 160), such as network congestion, bandwidth constraints, etc.; information regarding a failure of cache server 120; information regarding an overload condition of cache server 120; and/or other information indicating that the remaining portion of the requested resource cannot be retrieved from cache server 120. In response to event indication 830, application proxy 172 may cease communications with cache server 120, and may switch target source devices by providing request 810 (e.g., a HTTP byte range request) to origin device 130 or to another target source device of the requested resource. Based on request 810, origin device 130 may retrieve a remaining portion 840 of the resource requested by request 810. Origin device 130 may provide remaining resource portion 840 to application proxy 172.

Application proxy 172 may provide resource portion 820 and remaining resource portion 840 to client device 110. In one implementation, application proxy 172 may provide resource portion 820 to client device before providing remaining resource portion 840 to client device 110. In another implementation, application proxy 172 may wait to receive both resource portions 820/840, and may deliver resource portions 820/840 to client device 110 at the same time. Such an arrangement may ensure that a requested resource is completely provided to client device 110 even when one or more target source devices of the requested resource becomes unavailable (e.g., due to changing network conditions or target source device conditions).

Although FIG. 8 shows example components of network portion 800, in other implementations, network portion 800 may include fewer components, different components, differently arranged components, or additional components than depicted in FIG. 8. Alternatively, or additionally, one or more components of network portion 800 may perform one or more other tasks described as being performed by one or more other components of network portion 800.

Figure 9:
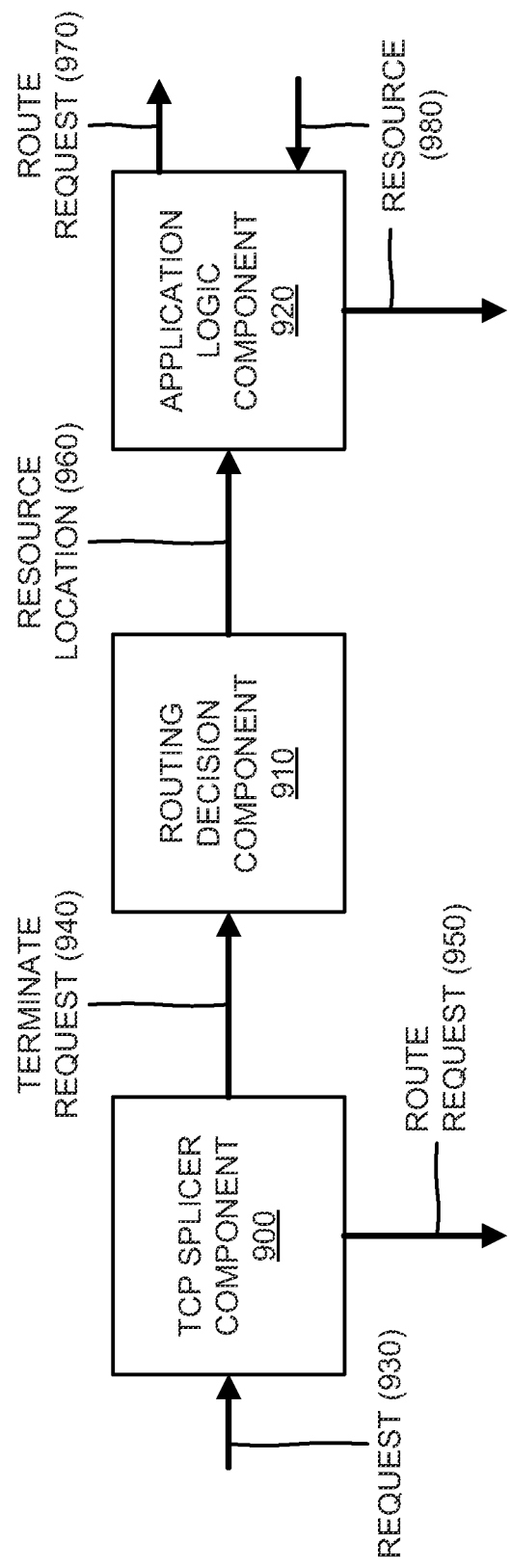
FIG. 9 is a diagram of example functional components of an application proxy of the network device depicted in FIG. 1.

FIG. 9 is a diagram of example functional components of application proxy 172 of network device 170. As shown, application proxy 172 may include a TCP splicer component 900, a routing decision component 910, and an application logic component 920. In one example implementation, one or more of the functional components described in connection with FIG. 9 may be implemented by one or more of the example components of device 200 (FIG. 2) or device 300 (FIG. 3).

TCP splicer component 900 may be responsible for efficient splicing of information provided between client device 110 and target source device connections (e.g., TCP connections). In one example, TCP splicer component 900 may splice information (e.g., packets) by changing headers in the packets, related to TCP sequence numbers, for a particular period of time (e.g., long enough to provide a resource request to a target source device and to receive the resource from the target source device). In one implementation, TCP splicer component 900 may be provided in a forwarding plane of network device 170 in order to scale application proxy 172 to a line rate (e.g., in gigabits per second) of network device 170. In another implementation, TCP splicer component 900 may be an accelerator for a cache miss/bypass path.

Application proxy 172 may receive a request 930 for a resource (e.g., via TCP splicer component 900) from client device 110, and may determine whether to use TCP splicer component 900 based on information provided in request 930. In one example, the information provided in request 930 may include IP information, such as a destination IP address of request 930, an IP address of client device 110 (i.e., a source IP address of request 930), a destination port of request 930, etc. When application proxy 172 decides to use TCP splicer component 900, application proxy 172 may terminate a connection (e.g., a TCP connection) for request 930 at network device 170, and may invoke TCP splicer component 900 to optimize transfer of the connection. If application proxy 172 terminates the connection for request 930, based on the information provided in request 930, TCP splicer component 900 may provide, to routing decision component 910, an indication 940 that the connection is terminated. If application proxy 172 does not terminate the connection for request 930, TCP splicer component 900 may forward request 930 to network 160 for additional routing, as indicated by reference number 950.

Routing decision component 910 may determine where to route requests for resources or portions of requests for resources. In one example implementation, routing decision component 910 may determine where (e.g., to which target source devices) to route requests for resources in a manner described above in connection with FIGS. 5A and 5B. As shown in FIG. 9, routing decision component 910 may receive indication 940 from TCP splicer component 900, and may determine a target source device for the resource requested by request 930. Routing decision component 910 may provide a location 960 of the determined target source device to application logic component 920.

Application logic component 920 may handle resource requests, switching of target source devices due to changing network conditions or target source device failure, etc. As shown in FIG. 9, application logic component 920 may receive location 960 of the determined target source device from routing decision component 910, and may route request 930 to location 960 of the determined target source device, as indicated by reference number 970. Application logic component 920 may receive a resource 980 from the target source device, and may forward resource 980 to client device 110.

Although FIG. 9 shows example functional components of application proxy 172, in other implementations, application proxy 172 may include fewer functional components, different functional components, differently arranged functional components, or additional functional components than depicted in FIG. 9. Alternatively, or additionally, one or more functional components of application proxy 172 may perform one or more other tasks described as being performed by one or more other functional components of application proxy 172.

In one example implementation, network device 170, application proxy 172, and local cache 174 may be deployed as standalone components in a service provider network. In another example implementation, network device 170, application proxy 172, and local cache 174 may be integrated into single device (e.g., a single server, a single media flow controller, a single network device, etc.). In a further example implementation, the functionality of one or more of application proxy 172 and local cache 174 may be integrated in network device 170.

Systems and/or methods described herein may provide fine-grain and dynamic routing, of resource requests and/or resources, which may scale to line rates of network device 170. Additionally, or alternatively, the systems and/or methods described herein may be integrated within the infrastructure (e.g., network device 170) of a core network (e.g., network 160), and may not require explicit manual provisioning of an overlay service. Additionally, or alternatively, the systems and/or methods may help federate resources among different service providers (e.g., via routing broker server 140), and may address resource routing for both transparent and reverse proxy deployments. Additionally, or alternatively, the systems and/or methods may improve the efficiency of TCP connections from client devices by terminating such connections at network device 170 where latency is at a minimum, and may provide transparent target source device failover especially for large resources, such as video and file downloads.

FIGS. 10-13 are flow charts of an example process 1000 for providing network integrated dynamic resource routing according to an implementation described herein. In one implementation, process 1000 may be performed by network device 170. In another implementation, some or all of process 1000 may be performed by one or more devices other than network device 170 or in combination with network device 170. One or more of the process blocks depicted in FIGS. 10-13 may be performed concurrently and independently of one or more other process blocks.

Figure 10:
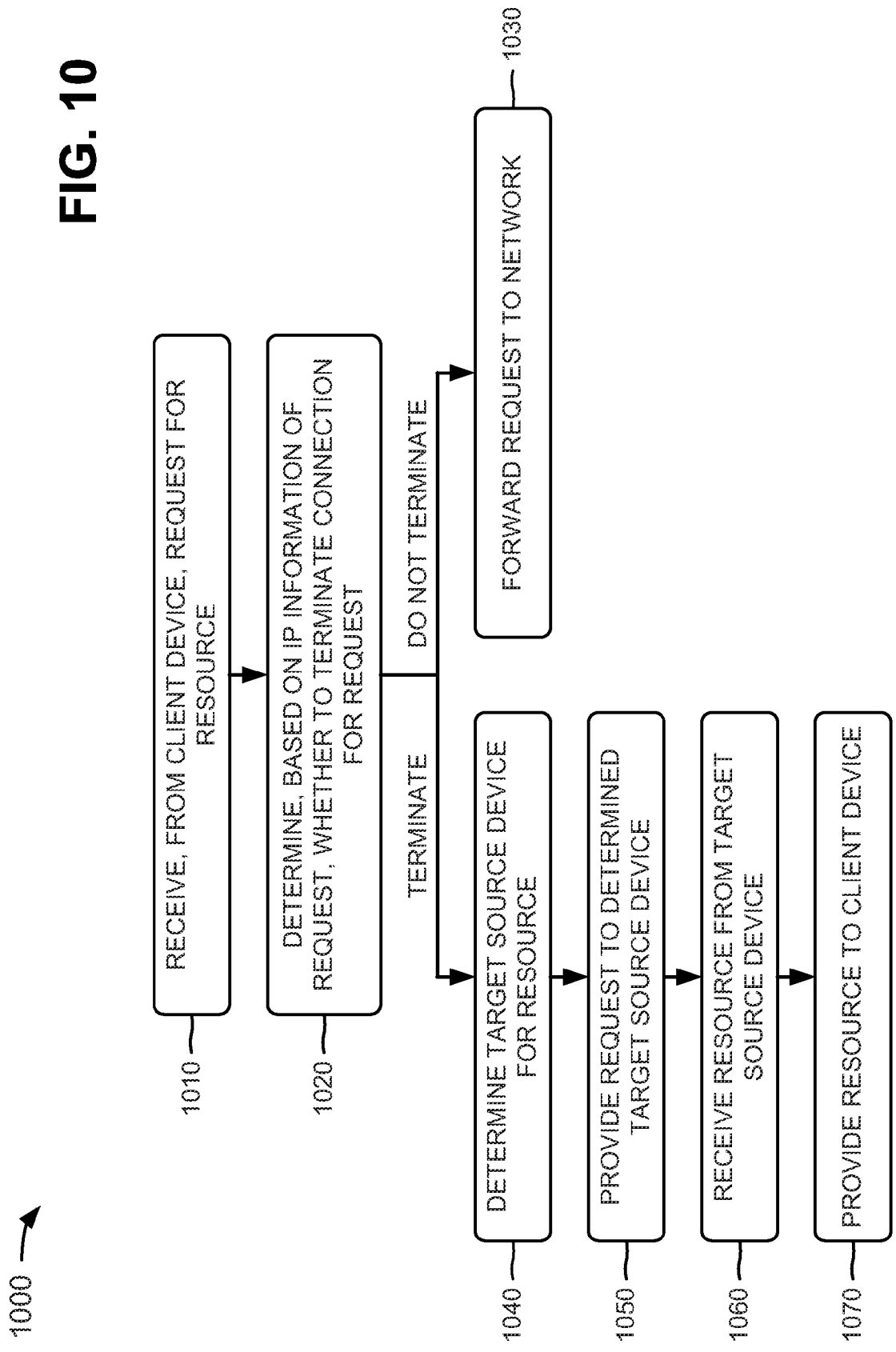

As illustrated in FIG. 10, process 1000 may include receiving, from a client device, a request for a resource (block 1010), and determining, based on IP information of the request, whether to terminate a connection for the request (block 1020). For example, in an implementation described above in connection with FIG. 4, client device 110 may provide request 410 for a resource to network device 170, and network device 170 may receive request 410 via application proxy 172. Application proxy 172 may receive request 410, and may determine, based on information provided in request 410, whether to terminate a connection (e.g., a TCP connection) for request 410 at network device 170. In one example, the information provided in request 410 may include IP information, such as a destination IP address of request 410, an IP address of client device 110 (i.e., a source IP address of request 410), a destination port of request 410, etc. Application proxy 172 may compare the information provided in request 410 to the information provided in the table, and may decide to terminate the connection for request 410 when the information provided in request 410 matches one or more items of information provided in the table.

As further shown in FIG. 10, when the connection is not terminated (block 1020—DO NOT TERMINATE), process 1000 may include forwarding the request to a network (block 1030). For example, in an implementation described above in connection with FIG. 4, if application proxy 172 decides to not terminate the connection for request 410, based on the information provided in request 410, application proxy 172 may provide, to client device 110, indication 430 that the connection is not terminated, and may forward request 410 to network 160 for additional routing, as indicated by reference number 440.

Returning to FIG. 10, when the connection is terminated (block 1020—TERMINATE), process 1000 may include determining a target source device for the resource (block 1040) and providing the request to the determined target source device (block 1050). For example, in an implementation described above in connection with FIG. 5B, if application proxy 172 terminates the connection for request 560 at network device 170, application proxy 172 may determine a target source device for the resource requested by request 560. In one example, application proxy 172 may provide query 570 to routing broker server 140. Query 570 may include a request for a location of a target source device that stores the resource requested by request 560. Routing broker server 140 may receive query 570, and may determine, based on query 570, the target source device for the resource requested by request 560. After determining the target source device, routing broker server 140 may provide location 580 (e.g., an IP address) of the target source device to application proxy 172. In one example, if location 580 identifies an IP address of cache server 120, application proxy 172 may provide request 560 to cache server 120, and cache server 120 may retrieve resource 590 requested by request 560.

As further shown in FIG. 10, process 1000 may include receiving the resource from the target source device (block 1060), and providing the resource to the client device (block 1070). For example, in an implementation described above in connection with FIG. 5B, cache server 120 may provide resource 590 to application proxy 172, and application proxy 172 may receive resource 590 and may forward resource 590 to client device 110.

Figure 11:
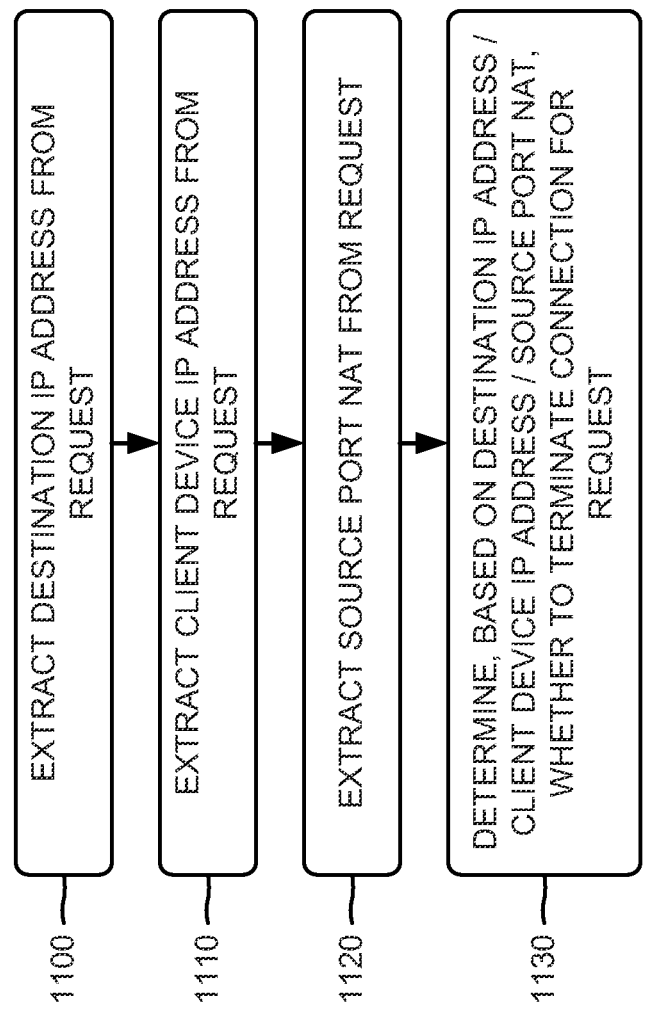

Process block 1020 may include the process blocks depicted in FIG. 11. As shown in FIG. 11, process block 1020 may include extracting a destination IP address from the request (block 1100); extracting a client device IP address from the request (block 1110); extracting a destination port from the request (block 1120); and determining, based on one or more of the destination IP address, the client device IP address, and the destination port, whether to terminate the connection for the request (block 1130). For example, in an implementation described above in connection with FIG. 4, application proxy 172 may extract the destination IP address from request 410, may extract the IP address of client device 110 from request 410, and/or may extract the destination port from request 410. Application proxy 172 may determine, based on the extracted destination IP address, client device 110 IP address, and/or destination port, whether to terminate the connection for request 410 at network device 170. In one example, application proxy 172 may maintain or access a table (or other data structure) that provides a list of applications, client device IP addresses, source device IP addresses, etc. Application proxy 172 may compare the information provided in request 410 to the information provided in the table, and may decide to terminate the connection for request 410 when the information provided in request 410 matches one or more items of information provided in the table.

Figure 12:
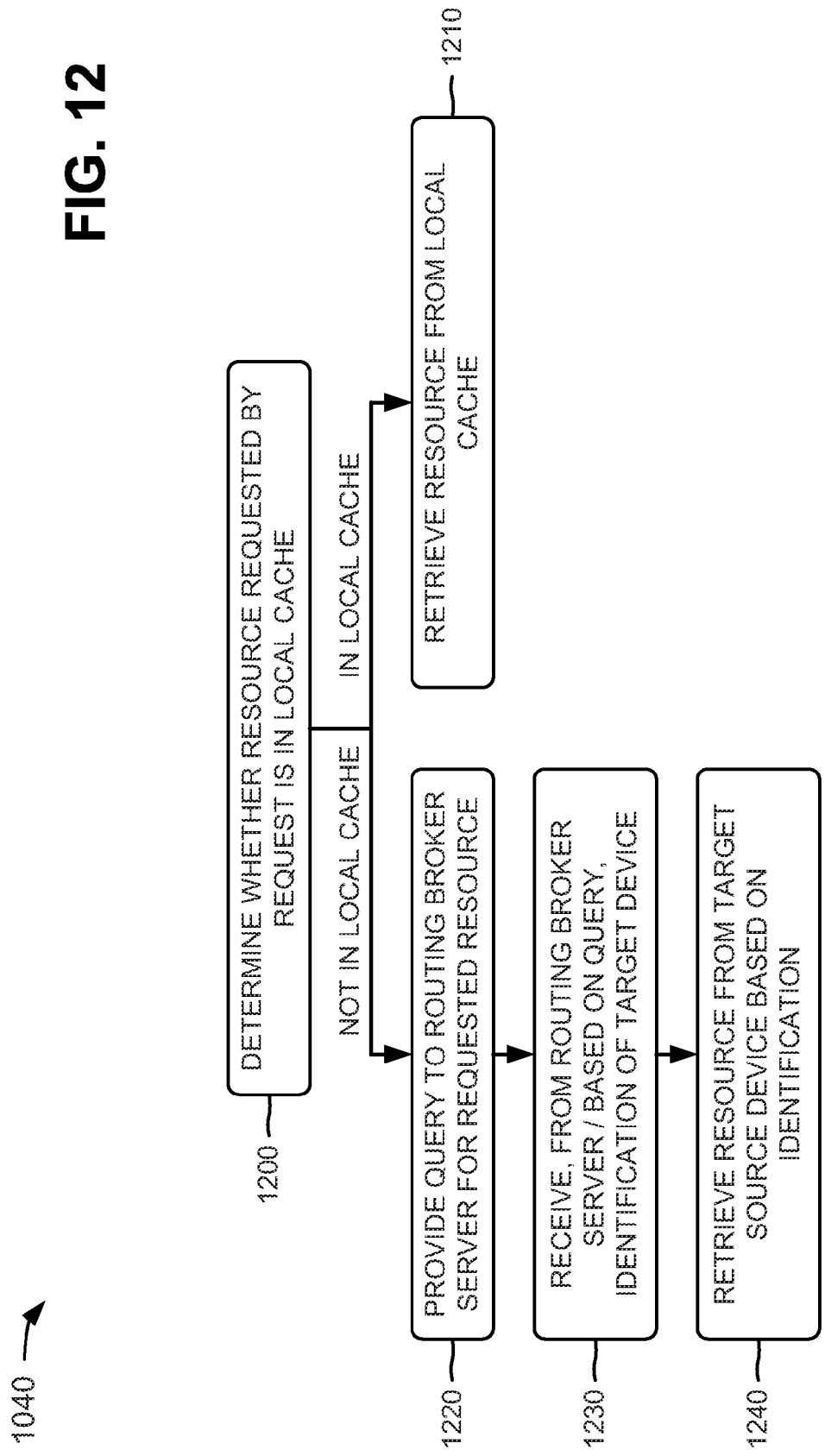

Process block 1040 may include the process blocks depicted in FIG. 12. As shown in FIG. 12, process block 1040 may include determining whether the resource requested by the request is stored in a local cache (block 1200). If the resource is stored in the local cache (block 1200—IN LOCAL CACHE), process block 1040 may include retrieving the resource from the local cache (block 1210). For example, in an implementation described above in connection with FIG. 5B, application proxy 172 may determine whether the requested resource is stored in local cache 174. In one example, application proxy 172 may maintain a table (or other data structure) that provides a list of resources stored in local cache 174. Application proxy 172 may scan the table to determine whether the requested resource is stored in local cache 174. If application proxy 172 determines that the requested resource is stored in local cache 174, application proxy 172 may retrieve the requested resource from local cache 174. For example, application proxy 172 may provide request 560 to local cache 174, and local cache 174 may retrieve resource 590 requested by request 560. Local cache 174 may provide resource 590 to application proxy 172, and application proxy 172 may forward resource 590 to client device 110.

As further shown in FIG. 12, if the resource is not stored in the local cache (block 1200—NOT IN LOCAL CACHE), process block 1040 may include providing a query to a routing broker server for the requested resource (block 1220), receiving, from the routing broker server and based on the query, an identification of the target source device (block 1230), and retrieving the resource from the target source device based on the identification (block 1240). For example, in an implementation described above in connection with FIG. 5B, if application proxy 172 determines that resource 590 is not stored in local cache 174, application proxy 172 may provide query 570 to routing broker server 140. Application proxy 172 may receive, from routing broker server 140 and based on query 570, location 580 of the target source device (e.g., cache server 120, origin device 130, and/or other device 150). Application proxy 172 may utilize location 580 to connect with the target source device and to retrieve the requested resource from the target source device.

Process blocks 1050-1070 may include the process blocks depicted in FIG. 13. As shown in FIG. 13, process blocks 1050-1070 may include connecting to the determined target source device (block 1300), providing a proxy of the request to the determined target source device (block 1310), receiving the resource from the target source device based on the proxy of the request (block 1320), and providing a proxy of the resource to the client device (block 1330). For example, in an implementation described above in connection with FIG. 6, application proxy 172 may connect to the determined target source device, and may provide proxy 620 of request 610 to the determined target source device. The target source device may retrieve resource 630 requested by proxy request 620, and may provide resource 630 to application proxy 172. Application proxy 172 may receive resource 630 from the target source device, and may provide proxy 640 of resource 630 to client device 110.

Systems and/or methods described herein may integrate resource routing into an infrastructure of a core network, such as a service provider network, by adding application level intelligence in an edge network device of the core network. The application level intelligence may include an application proxy that terminates connections for a given application associated with all or a subset of client device requests for resources. For each resource request, the application proxy may determine a target server that stores resources, may connect to the determined server, and may proxy the resource request and a returned resource between the client device and the determined server.

The term component, as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

The term packet, as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The term edge device, as used herein, is intended to be broadly construed to include any device that provides an entry point to or an exit point from a network, such as network 160. In one example implementation, network device 170 may correspond to an edge device.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 10-13, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosed implementations. In fact, many of these features may be combined in ways not specifically recited in the claims and/or disclosed in the specification. Although each dependent claim listed below may directly depend on only one other claim, the disclosed implementations include each dependent claim in combination with every other claim in the claim set.

No element, act, or instruction used in the present application should be construed as critical or essential to the disclosed implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a computing device and from a client device, a first request for a first resource,
the first request including an identifier of the client device;
selecting, by the computing device, a first target device for the first resource;
connecting the computing device with the first target device;
providing, by the computing device, a proxy of the first request to the first target device,
the proxy of the first request spoofing the identifier of the client device;
receiving, by the computing device, a first portion of the first resource from the first target device,
the first portion of the first resource including an identifier of the first target device;
receiving, by the computing device and after receiving the first portion of the first resource from the first target device, an indication of an event associated with the first target device or a network associated with the first target device;
selecting, by the computing device and after receiving the indication of the event, a second target device for the first resource;
retrieving, by the computing device, a second portion of the first resource from the second target device;
providing, by the computing device and to the client device, a proxy of the first resource based on the first portion of the first resource and the second portion of the first resource,
the proxy of the first resource spoofing the identifier of the first target device;
receiving, by the computing device and from the client device, a second request for a second resource,
the first request and the second request being associated with a connection;
selecting, by the computing device, a third target device for the second resource;
retrieving, by the computing device, the second resource from the third target device; and
providing, by the computing device, a proxy of the second resource to the client device,
the proxy of the second resource spoofing an identifier of the third target device.

2. The method of claim 1, where selecting the first target device comprises:
selecting the first target device from a plurality of server devices and a local cache, provided in or locally connected to the computing device, that store resources that include the first resource.

3. The method of claim 2, where selecting the first target device comprises:
determining that the first resource is not stored in the local cache; and
selecting the first target device from the plurality of server devices after determining that the first resource is not stored in the local cache.

4. The method of claim 1, further comprising:
creating the proxy of the first request by replacing the identifier of the client device, in the first request, with an Internet protocol (IP) address of the computing device.

5. The method of claim 1, further comprising:
creating the proxy of the first resource by replacing the identifier of the first target device, in the first portion of the first resource, with an Internet protocol (IP) address of the computing device.

6. The method of claim 1, where the first resource comprises content or a service.

7. The method of claim 1, where the indication of the event includes information indicating that the second portion of the first resource cannot be retrieved from the first target device.

8. The method of claim 1, where selecting the first target device comprises:
providing, to a server, a query for a location of a first target device that stores the first resource, and
receiving, from the server, information identifying the location of the first target device,
the computing device and the first target device being connected based on the information identifying the location of the first target device.

9. The method of claim 1, where retrieving the second portion of the first resource comprises:
providing the proxy of the first request to the second target device, and
receiving, from the second target device, the second portion of the first resource as a response to the proxy of the first request.

10. The method of claim 1, where the first target device is closer, in distance, to the computing device than the second target device or any other target device that stores the first resource.

11. The method of claim 1, further comprising:
determining whether to terminate the connection based on the second request, and
providing, to the client device, information indicating whether the connection is terminated.

12. A network device comprising:
a processor to:
receive, from a client device, a first request for a first resource,
the first request including an identifier of the client device, select a first target device for the first resource,
provide a proxy of the first request to the first target device,
the proxy of the first request substituting the identifier of the client device with an Internet protocol (IP) address of the network device, receive a first portion of the first resource from the first target device,
the first portion of the first resource including an identifier of the first target device,
receive, after receiving the first portion of the first resource from the first target device, an indication of an event associated with the first target device or a network associated with the first target device,
select, after receiving the indication of the event, a second target device for the first resource,
retrieve a second portion of the first resource from the second target device;
provide, to the client device, a proxy of the first resource based on the first portion and the second portion, the proxy of the first resource substituting the identifier of the first target device with the IP address of the network device,
receive, from the client device, a second request for a second resource, the first request and the second request being associated with a connection,
select a third target device for the second resource,
retrieve the second resource from the third target device, and
provide a proxy of the second resource to the client device,
the proxy of the second resource substituting an identifier of the third target device with the IP address of the network device.

13. The network device of claim 12,
where, when selecting the first target device, the processor is to:
select the first target device from a plurality of server devices that store resources that include the first resource, and
where, when selecting the second target device, the processor is to:
select the second target device from the plurality of server devices.

14. The network device of claim 12, where, when selecting the first target device, the processor is to:
determine that the first resource is not stored in a local cache associated with the network device, and
select the first target device from a plurality of server devices after determining that the first resource is not stored in the local cache.

15. The network device of claim 12, where the indication of the event includes information indicating that the second portion of the first resource cannot be retrieved from the first target device.

16. The network device of claim 12, where, when selecting the first target device, the processor is to:
provide, to a server, a query for a location of a first target device that stores the first resource, and
receive, from the server and before connecting the network device with the first target device, information identifying the location of the first target device as a response to the query.

17. The network device of claim 12, where, when retrieving the second portion of the first resource, the processor is to:
provide the proxy of the first request to the second target device, and
receive, from the second target device, the second portion of the first resource as a response to the proxy of the first request.

18. The network device of claim 12, where the first target device is closer, in distance, to the network device than the second target device or any other target device that stores the first resource.

19. A non-transitory computer-readable medium storing instructions, the instructions comprising:
one or more instructions that, when executed by one or more processors of a system, cause the one or more processors to:
receive, from a client device, a first request for a first resource,
the first request including an identifier of the client device;
select a first target device for the first resource from a plurality of server devices storing resources that include the first resource;
provide a proxy of the first request to the first target device,
the proxy of the first request spoofing the identifier of the client device;
receive a first portion of the first resource from the first target device, and
the first portion of the first resource including an identifier associated with the first target device;
receive, after receiving the first portion of the first resource from the first target device, an indication of an event associated with the first target device or a network associated with the first target device;
select, after receiving the indication of the event, a second target device for the first resource from the plurality of server devices;
retrieve a second portion of the first resource from the second target device;
provide, to the client device, a proxy of the first resource based on the first portion and the second portion,
the proxy of the first resource spoofing the identifier of the first target device;
receive, from the client device, a second request for a second resource,
the first request and the second request being associated with a connection;
select a third target device for the second resource;
retrieve the second resource from the third target device; and
provide a proxy of the second resource to the client device,
the proxy of the second resource spoofing an identifier of the third target device.

20. The non-transitory computer-readable medium of claim 19, where the instructions further comprise:
one or more instructions that, when executed by the one or more processors, cause the one or more processors to:
create the proxy of the first request by replacing the identifier of the client device, in the first request, with an Internet protocol (IP) address associated with the system.

21. The non-transitory computer-readable medium of claim 19, where the instructions further comprise:
one or more instructions that, when executed by the one or more processors, cause the one or more processors to:
create the proxy of the first resource by replacing the identifier of the first target device with an Internet protocol (IP) address associated with the system.

22. The non-transitory computer-readable medium of claim 19, where the indication of the event includes information indicating that the second portion of the first resource cannot be retrieved from the first target device.

23. The non-transitory computer-readable medium of claim 19, where the first resource comprises content or a service.

24. The non-transitory computer-readable medium of claim 19, where the one or more instructions to retrieve the second portion of the first resource include:
one or more instructions that, when executed by the one or more processors, cause the one or more processors to:
provide the proxy of the first request to the second target device, and
receive, from the second target device, the second portion of the first resource as a response to the proxy of the first request.

25. The non-transitory computer-readable medium of claim 19, where the first target device is closer, in distance, to the system than the second target device or any other target device that stores the first resource.

* * * * *